United States Patent [19]

Blahut et al.

[11] 4,348,720
[45] Sep. 7, 1982

[54] MICROCOMPUTER ARRANGED FOR DIRECT MEMORY ACCESS

[75] Inventors: Donald E. Blahut, Holmdel; Victor K. Huang, Scotch Plains; Richard L. Townsend, Jr., Berkeley Heights, all of N.J.

[73] Assignee: Bell Telephone Laboratories, Incorporated, Murray Hill, N.J.

[21] Appl. No.: 71,750

[22] Filed: Aug. 31, 1979

[51] Int. Cl.³ ............................................... G06F 1/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,673,576 | 6/1972 | Donaldson, Jr. | 364/200 |
| 4,075,691 | 2/1978 | Davis et al. | 364/200 |
| 4,122,520 | 10/1978 | Adamchick et al. | 364/200 |
| 4,137,565 | 1/1979 | Mager et al. | 364/200 |
| 4,145,739 | 3/1979 | Dunning et al. | 364/200 |
| 4,181,938 | 1/1980 | Suzuki et al. | 364/200 |

OTHER PUBLICATIONS

Osborne, A.; "An Introduction to Microcomputers, vol. I"; 1976; pp. 5-34 to 5-41.
Osborne, A. et al.; "An Introduction to Microcomputers, vol. II"; 1977; pp. 1-1 to 1-2, 2-36 to 2-37, 4-133 to 4-143.
Holden, J. R. et al.; "Microprocessor Techniques for Telephone-Oriented Applications"; GTE Auto. Elec. Tech. Jour.; vol. 14, No. 6; Apr. 1975; pp. 284-297.
Chow, W. F. et al.; "MAC-4: A Single-Chip Microcomputer"; Bell System Tech. Jour.; vol. 58, No. 4; Apr. 1979; pp. 959-962.
Signetics Applications Notes Re PLAs; Jul. 1975; pp. 4-22.
Supplement to the TTL Data Book for Design Engineers; First Edition, Texas Instruments; 1974, pp. S-296 to S-297.

*Primary Examiner*—Gareth D. Shaw
*Assistant Examiner*—Thomas M. Heckler
*Attorney, Agent, or Firm*—Richard B. Havill

[57] ABSTRACT

A microcomputer system arranged for performing direct memory access operations has direct memory access circuitry included on a single chip with the main processor of the microcomputer. Addressing for direct memory access operations is accomplished by circuitry also used for generating addresses when processing routine instructions in the main processor.

14 Claims, 25 Drawing Figures

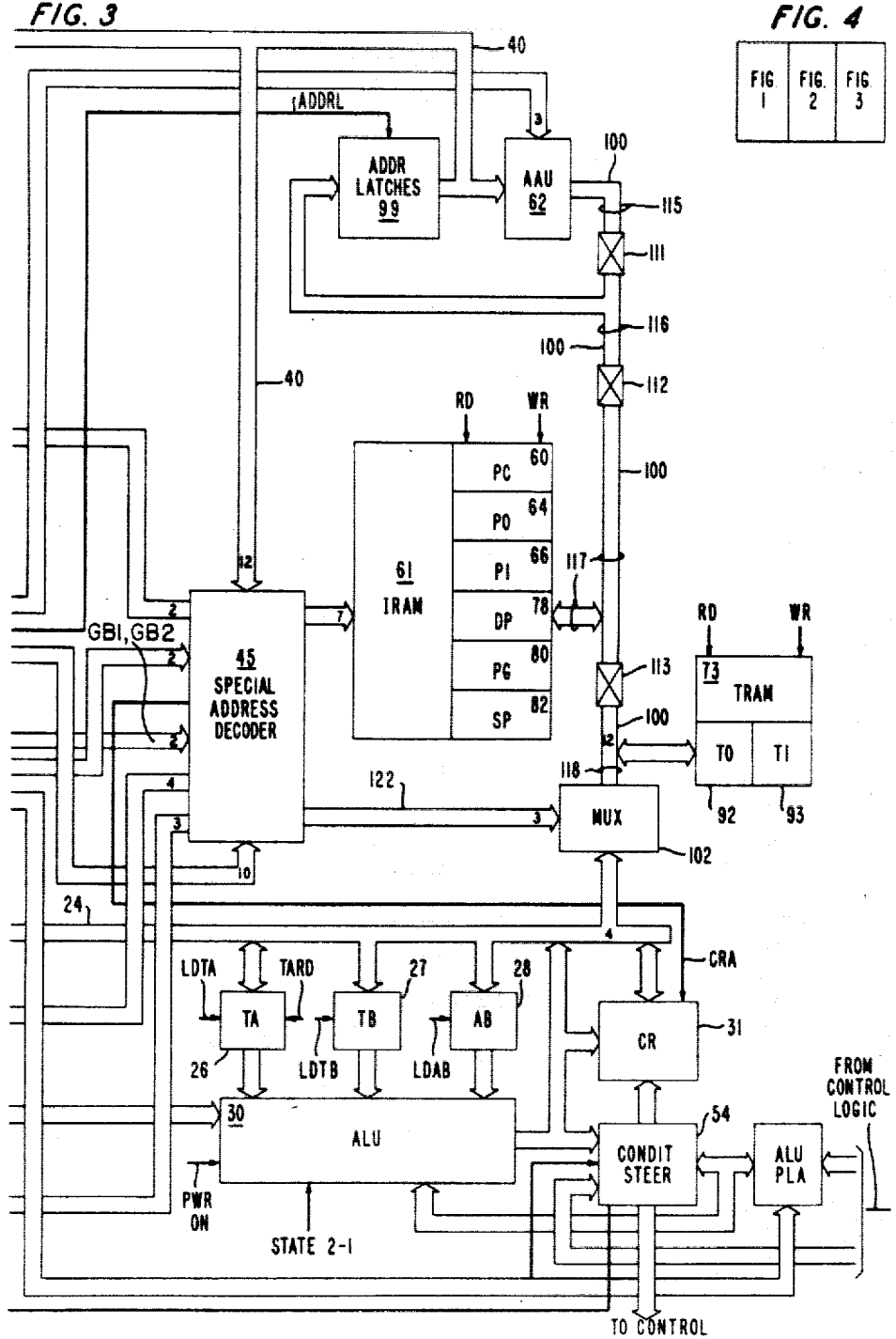

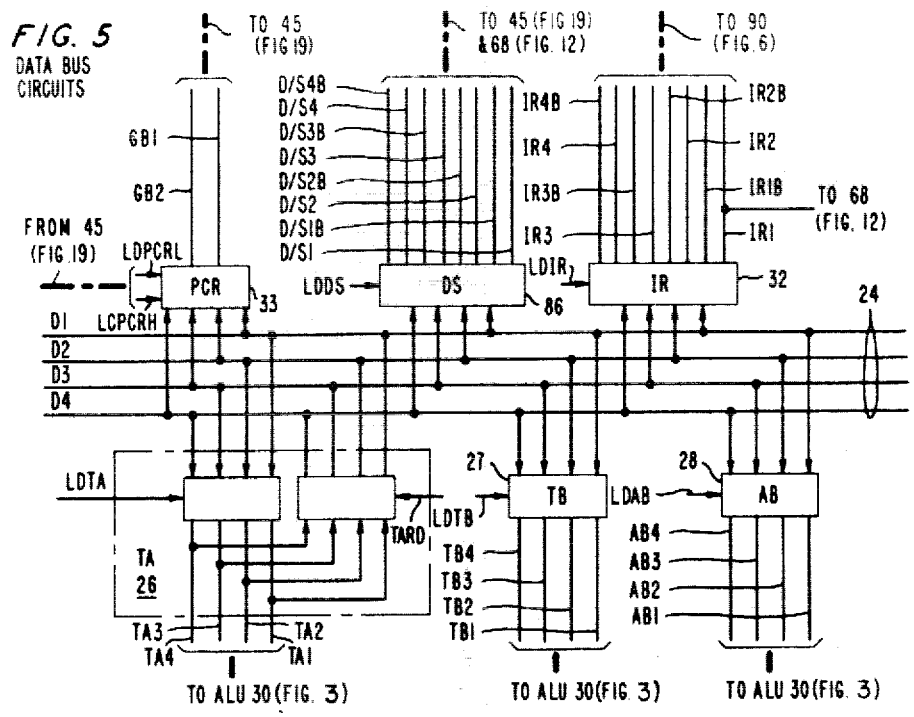
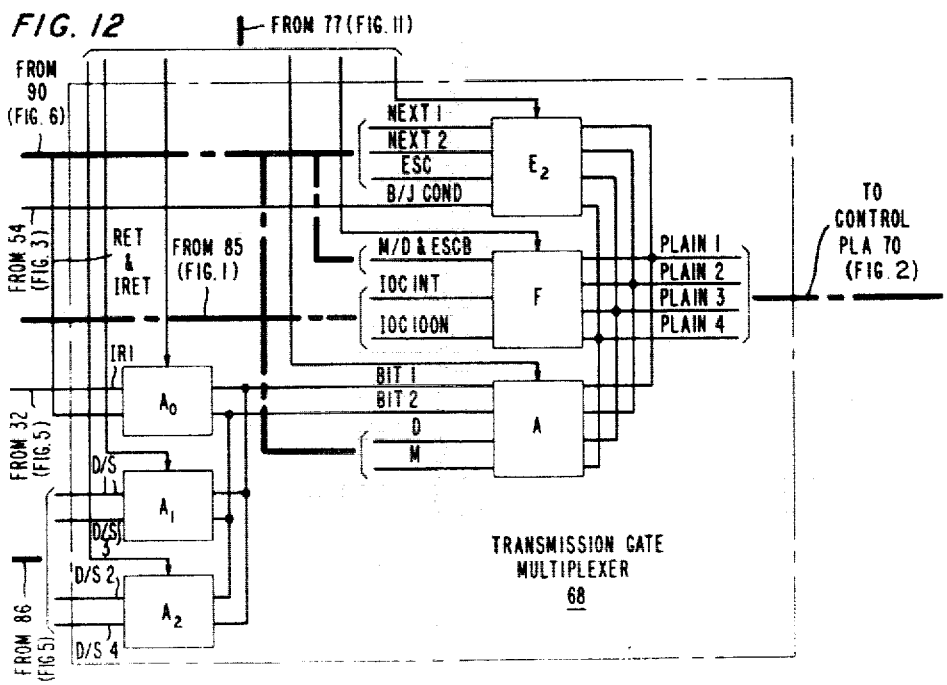

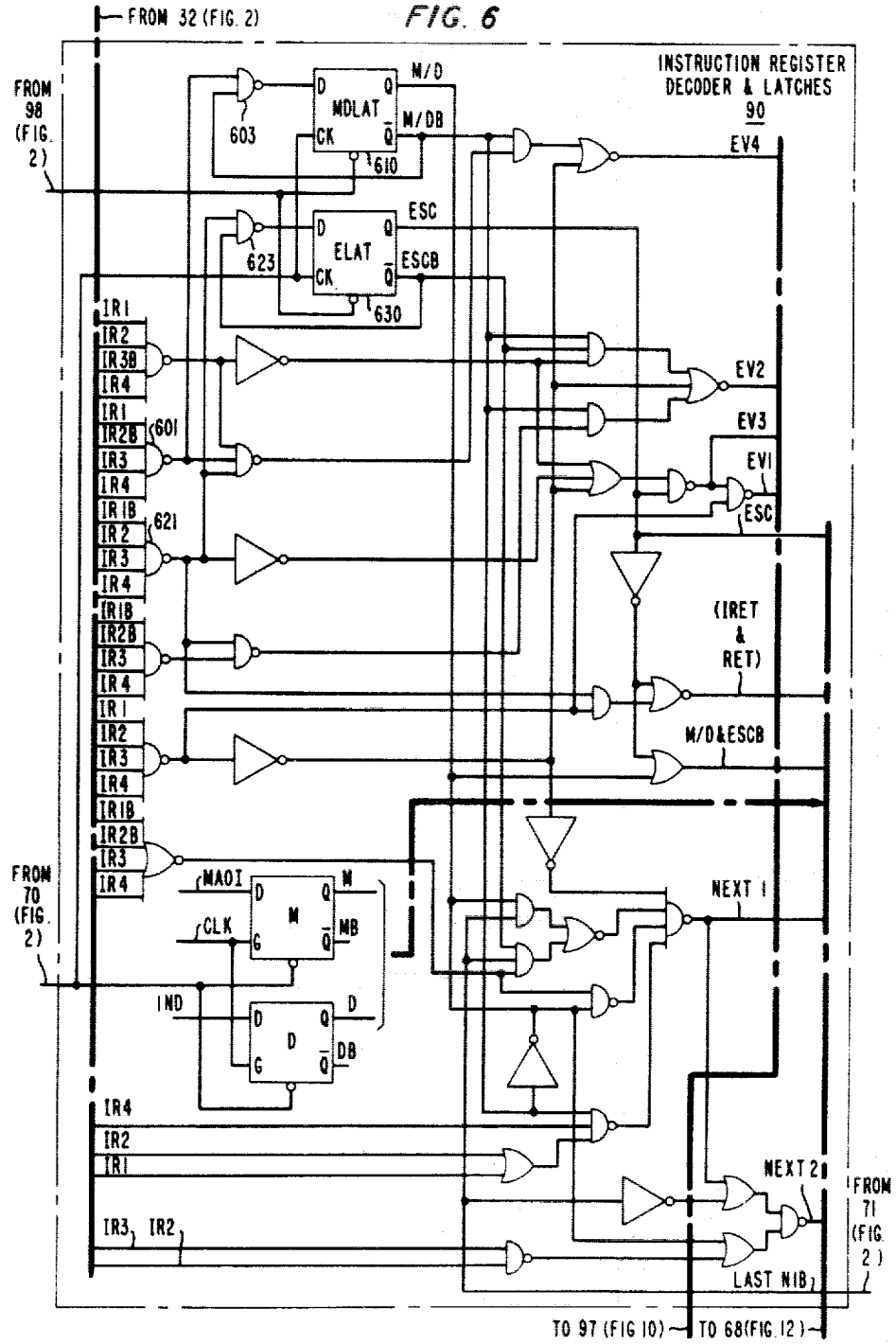

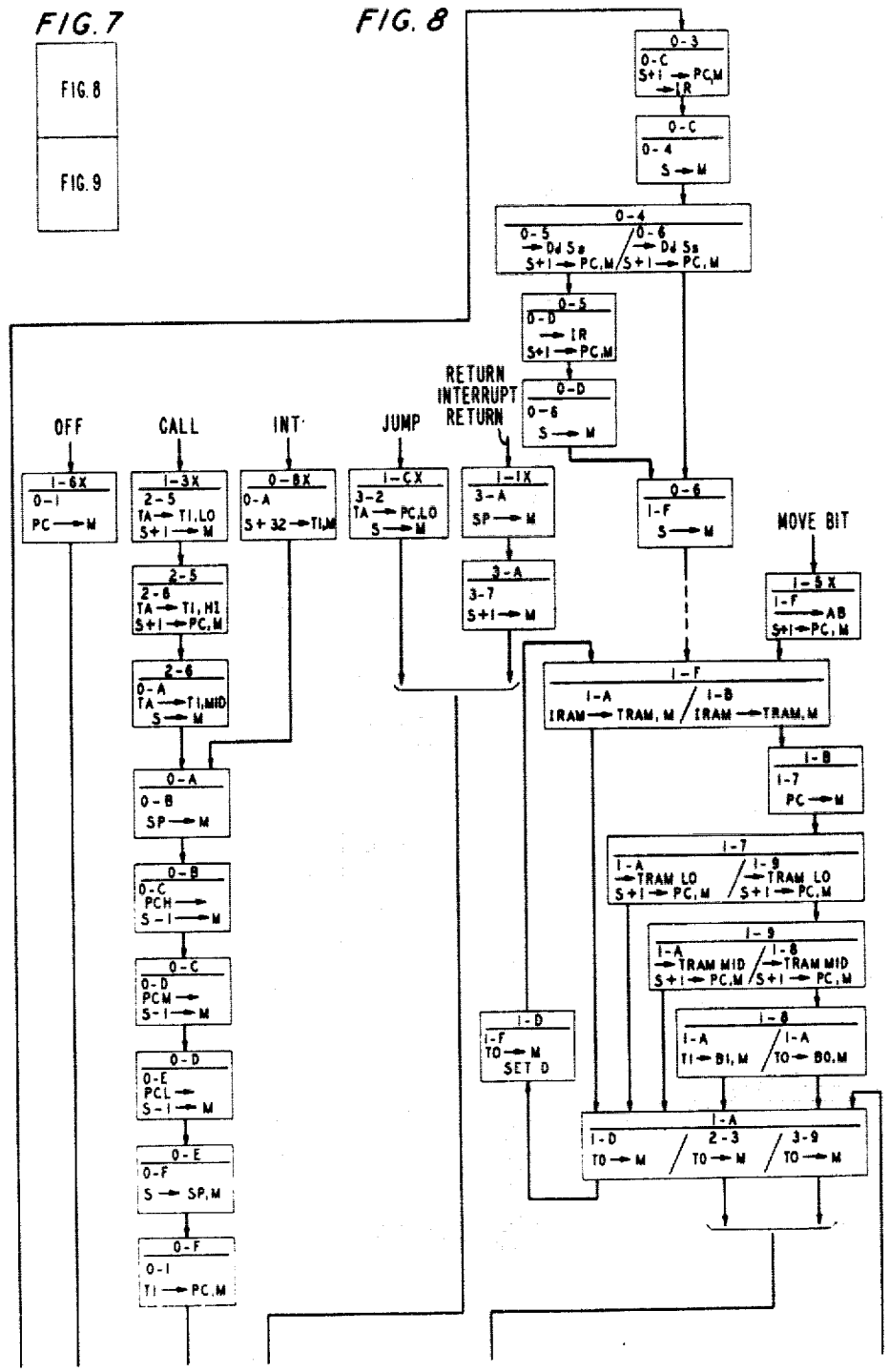

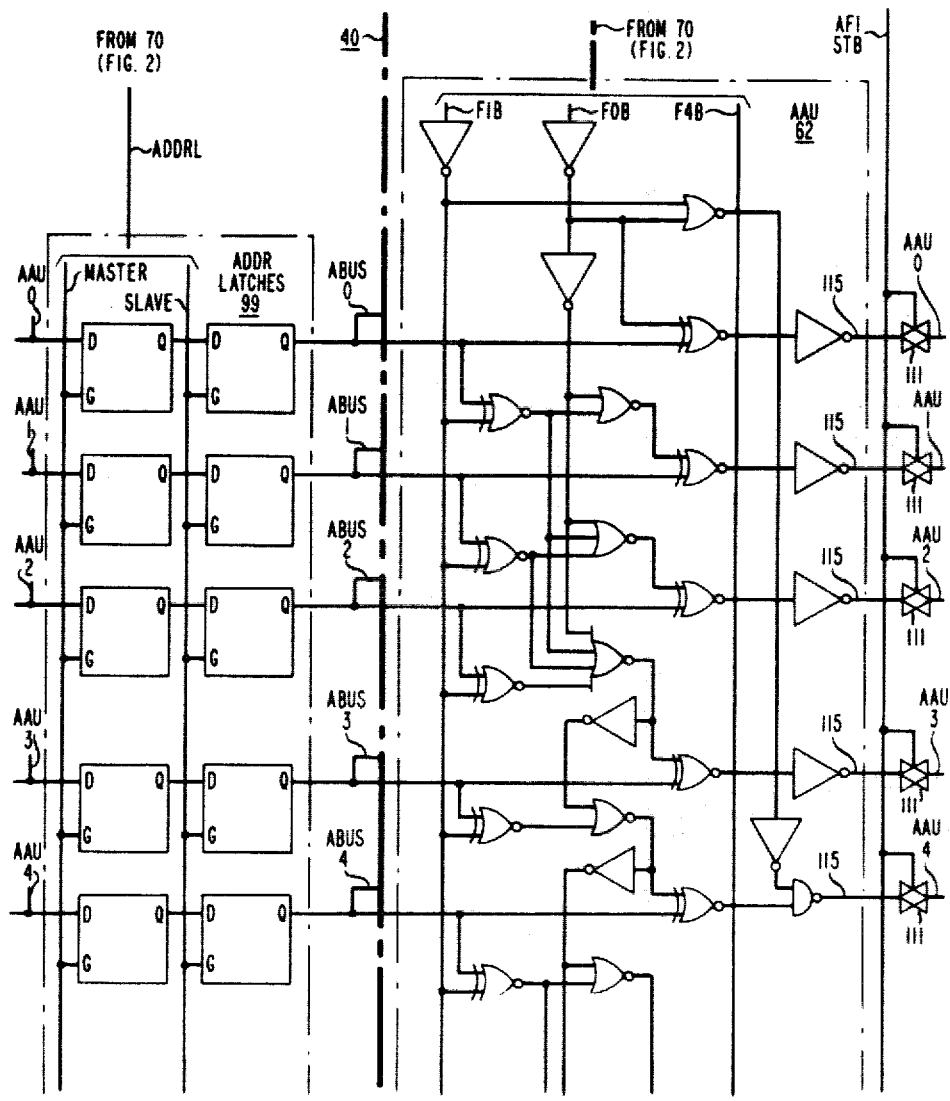

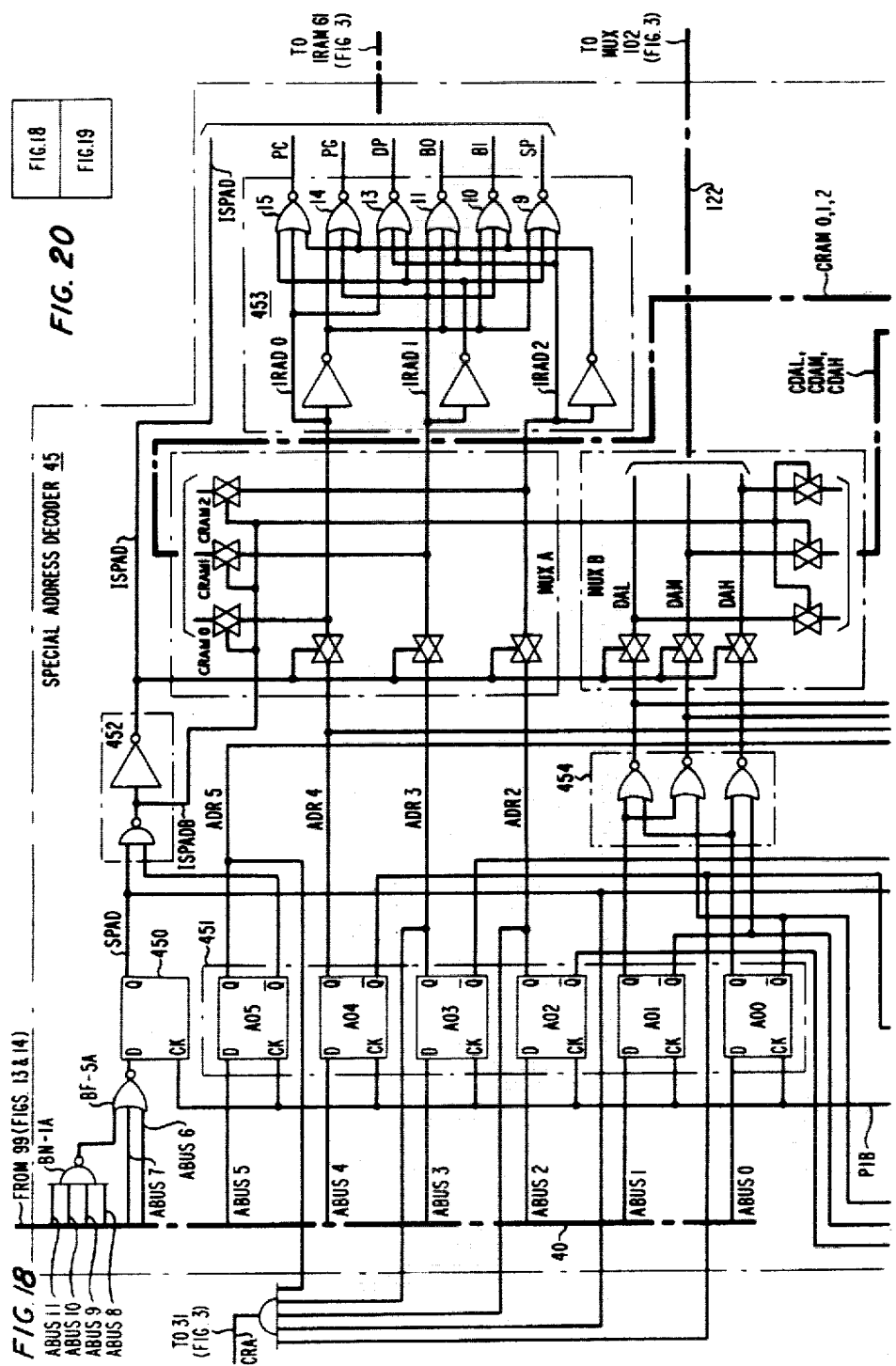

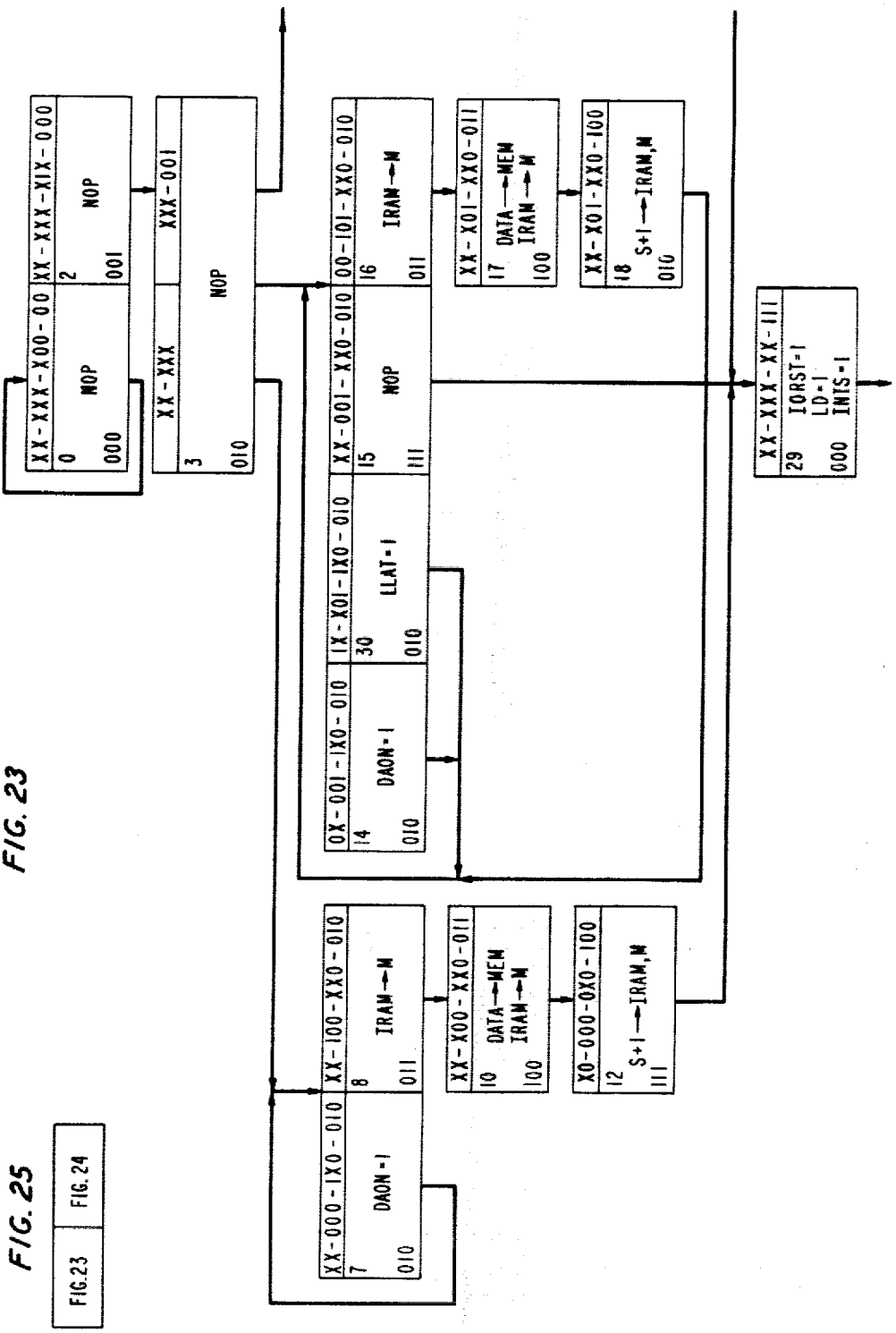

MICROCOMPUTER ARRANGED FOR DIRECT MEMORY ACCESS

CROSS-REFERENCE TO RELATED APPLICATIONS

Related subject matter is included in the following copending patent applications:

D. E. Blahut-R. L. Ukeiley 7-3, Ser. No. 71,712, entitled "Microcomputer Using Double Opcode Instructions" and filed concurrently herewith;

D. E. Blahut-D. H. Copp-D. C. Stanzione 9-2-2, Ser. No. 974,425, filed Dec. 29, 1978, now U.S. Pat. No. 4,258,419;

D. E. Blahut-D. H. Copp-D. C. Stanzione 10-3-3, Ser. No. 974,363, filed Dec. 29; 1978, now U.S. Pat. No. 4,250,545;

D. E. Blahut-D. H. Copp-D. C. Stanzione 11-4-4, Ser. No. 974,361, filed Dec. 29, 1978, now U.S. Pat. No. 4,240,142; and V. K. Huang 3, Ser. No. 71,717, entitled "Special Address Generation Arrangement" and filed concurrently herewith, now U.S. Pat. No. 4,306,287.

TECHNICAL FIELD

This invention relates generally to a microcomputer system and, more particularly, to a microcomputer system arranged for direct memory access operation.

BACKGROUND OF THE INVENTION

Microcomputers are being designed and fabricated as single large scale integrated (LSI) circuit chips including an arithmetic logic unit, a controller, registers, program and data memories and timing circuitry. Typically, such microcomputers use metal oxide semiconductor/large scale integration (MOS/LSI) technology. Other technologies can be and are used.

In prior art microcomputer systems, arrangements are made for performing direct memory access operations. In such an operation, a peripheral device requests that a transfer of information be made between the peripheral device and the memory of the microcomputer. The central processor of the microcomputer suspends operation for a cycle at a time, and the information is transferred directly from the peripheral device to the memory or viceversa without passing through the arithmetic logic unit of the main processor and without being controlled by the central processing unit.

Such a direct memory access operation is controlled by special circuitry that is separate from the main processor arrangement. A general description of a direct memory access arrangement is presented by A. Osborne in *An Introduction to Microcomputers* Vol. 1, 1976, pages 5-34 to 5-41. The direct memory access controller generates addresses for the direct memory access operations. The special circuitry described there includes an address register, a counter register, and an incrementing or decrementing circuit. It is noted that this circuitry is separate from and therefore in addition to the circuitry of the main processor.

The main processor generates addresses for use in processing routine instructions. In the main processor, there is an address register and an incrementing or decrementing circuit for performing address operations in processing the routine instructions.

Thus the prior art direct memory access arrangement includes duplicate address register and incrementing or decrementing circuits, one in the main processor and another in the direct memory access controller. When built in LSI chips, this presents a problem because the duplication requires extra chip area which increases the cost of the chip because fewer chips fit on a wafer and the yield of good chips from each wafer is reduced.

SUMMARY OF THE INVENTION

This problem is overcome in a microcomputer system having an addressable memory, a main processing unit and a direct memory access circuitry interconnected by an internal data bus, an addressing means connected by way of an address bus to the addressable memory for applying by way of the address bus a first address from which data is read to the main processing unit during a first period, the system being characterized in that the addressing means additionally applies to the addressable memory by way of the address bus during a second period a second address from which data is transferred to the direct memory access circuit or to which data is transferred from the direct memory access circuit in response to an asynchronous clock signal.

BRIEF DESCRIPTION OF THE DRAWING

The invention will be more fully understood from the following detailed description of illustrative embodiments thereof when that description is read in conjunction with the attached drawing wherein FIGS. 1, 2 and 3, when positioned in accordance with FIG. 4, form a block diagram of a microcomputer;

FIG. 5 is a logic schematic of data bus circuits;

FIG. 6 is a logic schematic of an instruction register decoder and latches;

FIG. 7 shows the positioning of FIGS. 8 and 9 which form a state diagram showing sequences of operations for instructions performed by the microcomputer of FIGS. 1-3;

FIG. 12 is a logic schematic of a transmission gate multiplexer;

FIGS. 13 and 14, when positioned in accordance with FIG. 15, present a logic schematic of an address arithmetic unit with buses and gates;

FIGS. 18 and 19 when positioned in accordance with FIG. 20 show a logic schematic of a special address circuit and a special register arrangement;

FIGS. 23 and 24 when positioned in accordance with FIG. 25 form a state diagram showing the sequence of operations of direct memory access operations performed by the processor of FIGS. 1-3.

DETAILED DESCRIPTION

Figure 1:
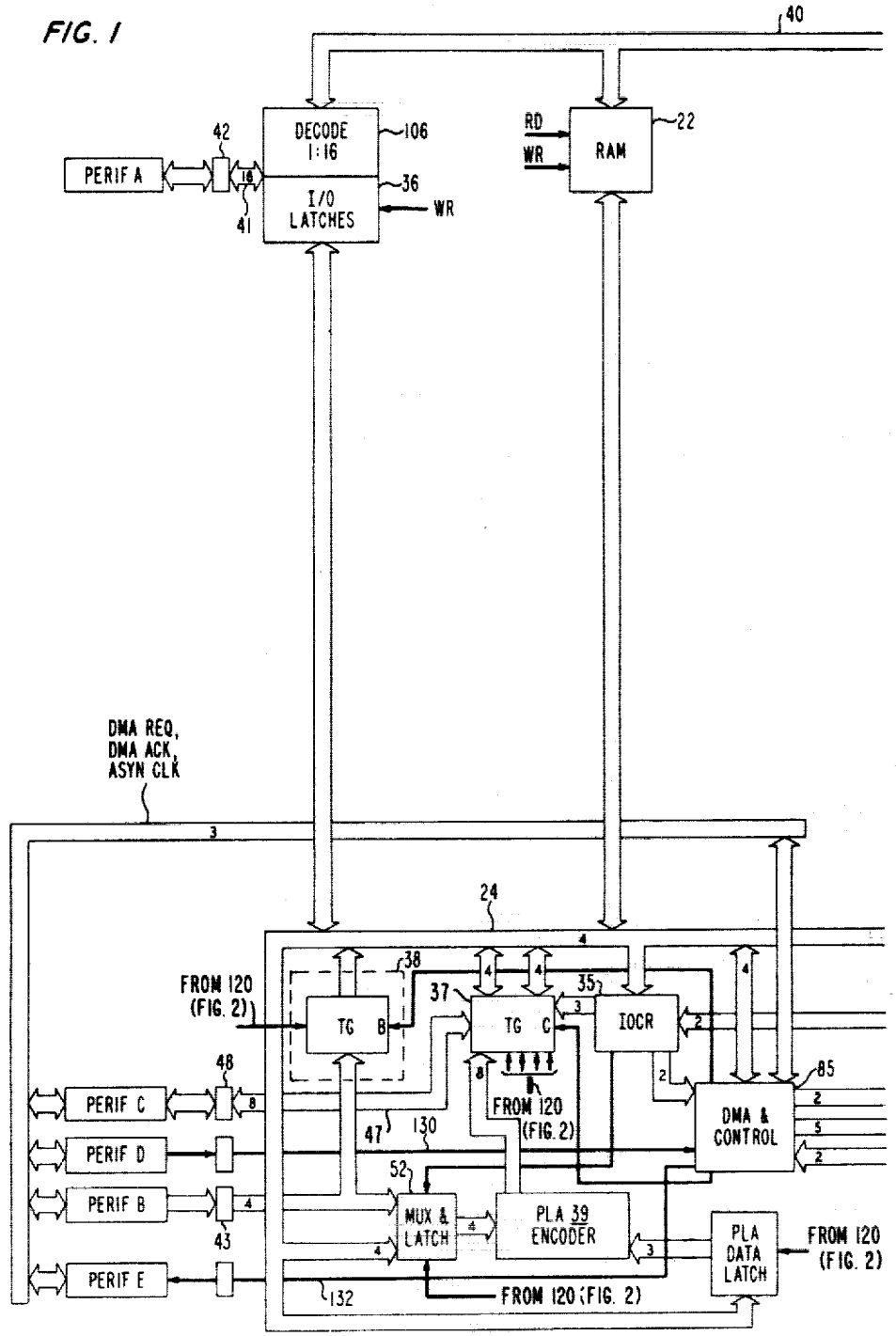
Figure 2:
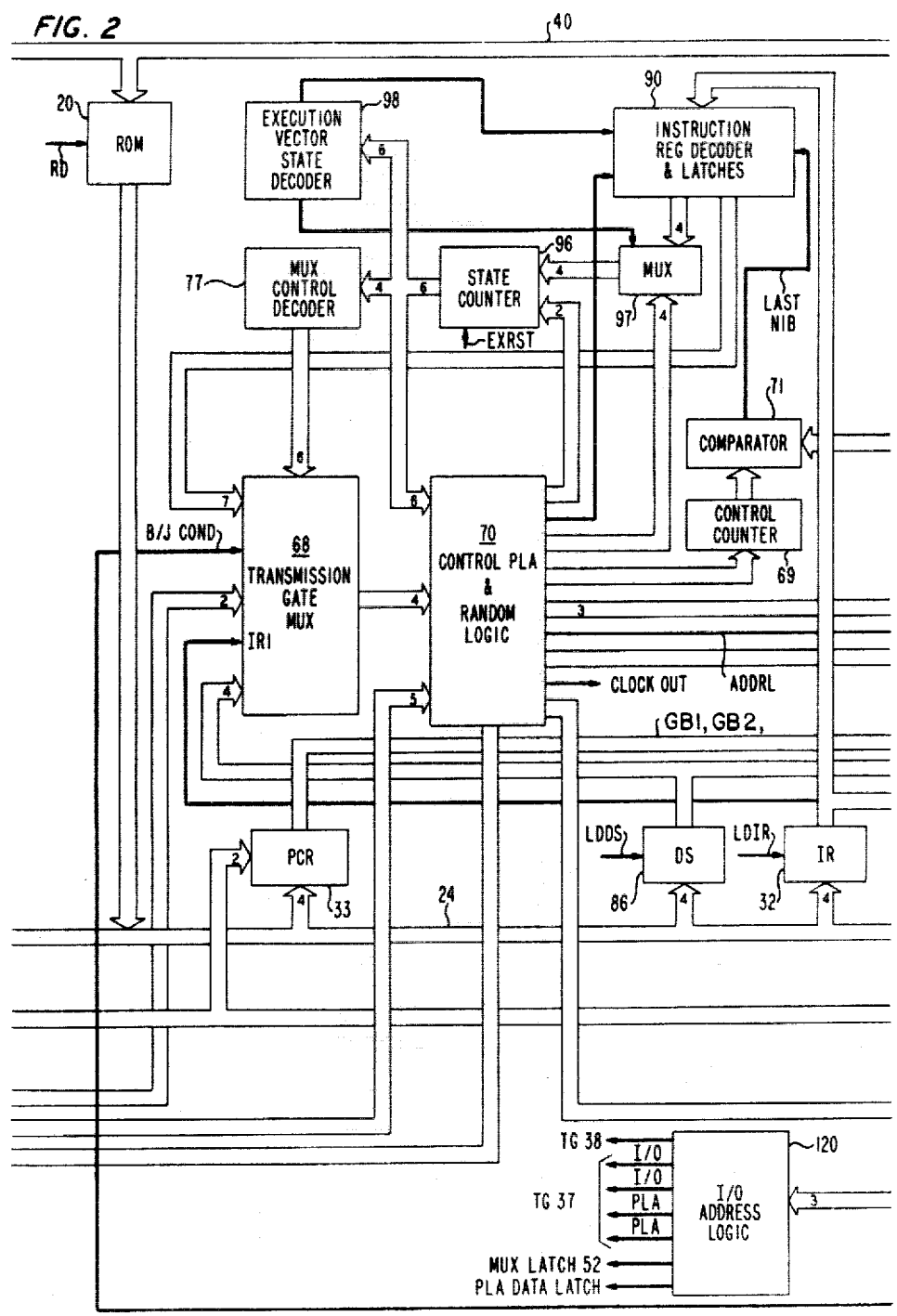

Referring now to FIGS. 1, 2 and 3, there is shown a block diagram of a microcomputer that is fabricated on a single CMOS/LSI chip. Included on the chip are a read only memory 20 and a random access memory 22 which are coupled through a 4-bit on-chip data bus 24 and a group of temporary registers (TA, TB and AB)

26, 27 and 28 to a 4-bit parallel arithmetic logic unit (ALU) 30. Several other on-chip registers are coupled to the on-chip data bus 24 so that they are addressable by the user. Extensive input/output circuitry and direct memory access circuitry are provided on the chip for increasing the versatility and efficiency of the microcomputer. The memory and registers are to be described in more detail hereinafter.

A controller section, shown mostly in FIG. 2, coordinates and executes sequential operations of the microcomputer while it accomplishes whatever functions are required in accordance with instructions applied thereto from the read only memory 20 or the random access memory 22. The contents of a condition register (CR) 31 are modified as a result of operations occurring in the arithmetic logic unit 30.

Although the arithmetic logic unit 30 is a 4-bit parallel circuit arrangement, it is capable of performing arithmetic and logic operations on either signals or multiple nibble operands in response to a single program instruction. In response to information stored in an instruction register (IR) 32 and a processor control register (PCR) 33, the controller section of FIG. 2 determines the mode and the type of operation performed on single and multiple nibble operands. Basically an opcode word, stored in the instruction register 32, determines a processing sequence for designated data.

This sequence may be modified depending upon what information is stored in the processor control register 33. In particular, operations on multiple nibble operands are accomplished by a sequence resulting from such a modification to the processing sequence. This modification to the processing sequence together with decoded control signals, derived in response to special addresses encountered during processing, cause the controller section to vary the number of nibbles of data that are processed by the instruction stored in the instruction register. Generation of such special addresses and the decoding of control signals derived therefrom are discussed in detail in the aforementioned patent application Ser. No. 71,717, in the name of V. K. Huang, entitled "Special Address Generation Arrangement" and filed concurrently herewith.

Memory

The memory arrangement includes both the read only memory 20 primarily for program storage and the random access memory 22 primarily for data storage.

Read only memory 20 is presented in FIG. 2 with the controller section because this memory primarily provides instructions for controlling the execution of machine operations. Programming of the read only memory occurs at the mask level and is not alterable.

Random access memory 22 is presented in FIG. 1 with the input/output circuitry because the random access memory often is involved in transfers of data to and from one of a plurality of peripheral devices (A, B, C, D and E) interconnecting with the input/output circuitry and located at the lefthand side of FIG. 1.

Addressable Registers

The microcomputer includes many registers arranged in different ways to accomplish a variety of convenient functions. Some of those registers have been mentioned previously and some have not. All of the registers are to be described in more detail hereinafter. The microcomputer shown in FIGS. 1, 2 and 3 includes ten (10) user addressable registers but unlike most microcomputers there is no pre-assigned accumulator.

User Addressable Special Registers

The user addressable registers include the following registers.

The condition register 31 is a 4-bit set of bistable latch circuits which store signals indicating the status, or condition, of data resulting from arithmetic or logic operations except when the condition register is a destination. The condition register and the condition steering circuit 54 are interposed between the arithmetic logic unit 30 and the internal data bus 24. Both the arithmetic logic unit and the internal data bus are arranged to process 4-bit data in parallel. This condition register is addressable so that it can be accessed for loading and reading by way of the data bus. The status signals, called "flags", include zero, parity, carry, and overflow flags. Although arithmetic operations produce data which may effect any of the four flags, logic operations produce data which may affect only the zero and parity flags and conditional instructions do not affect any of the flags. Because the microcomputer operates on operands having various numbers of nibbles, the flag signals must be generated and stored avoiding erroneous intermediate and final flag signals. A group of flag control, or condition steering, circuit arrangements 54 generate this correct status information for all arithmetic and logic operations performed by the microcomputer. Either this status information or information loaded by program control through the data bus 24 is the data stored in the condition register 31.

In the condition register, the zero flag circuit arrangement includes an all zeros logic circuit with a feedback path used for handling accurately multiple nibble operation data. Some logic and timing signals couple the stored all zeros signal to a latch circuit for storage and readout to the data bus 24 while another latch can change state in response to later processing conditions.

Additionally in the condition register, the parity flag circuit also includes a feedback arrangement for handling multiple nibbles. A latch circuit stores the parity signal for retention and readout to the data bus 24 in response to program control.

Also in the condition register, the carry flag circuit includes master and slave latch circuits for receiving and storing carry signals resulting from arithmetic operations in the arithmetic logic unit 30. In response to program control, the carry flag stored in the slave latch can be read out to the data bus 24.

Further in the condition register, the overflow flag circuit is a latch circuit which is controlled by overflow signals generated in the arithmetic logic unit 30.

As previously mentioned, the condition register circuits are addressable and can be written with information present on the internal data bus 24. Alternatively, once information is stored in the condition register 31 that information can be read out onto the internal data bus 24 under program control.

A 12-bit wide program counter (PC) 60 stores the address of the next instruction to be executed. It operates conventionally wherein its contents are set to a hexadecimal address x(000) at the commencement of processing. Thereafter the content are incremented by an address arithmetic unit (AAU) 62 some specific number of times during each instruction unless the content are changed during the execution of the current instruction, such as by a jump instruction. Such incrementing continues throughout processing until the desired program sequence is completed.

Memory pointer register (P0 and P1) 64 and 66 are 8-bit registers used for indirectly addressing memory locations. When used as pointers, they each store the two least significant nibbles of the address being pointed to.

As shown in FIGS. 2 and 5, the processor control register (PCR) 33 is a several bit wide register, two bits GB1 and GB2 of which enable a programmer to set the operand width at either 4, 8, 12, or 16 bits. Processor control register 33 is coupled to the data bus and is arranged as an address in addressable memory space. Information is stored in the register 33 from time to time in accordance with the programmer's requirements. A typical program routine may load the processor control register 33 only once. A "Move" instruction (MOV) is used to load the regiser 33. The data to be loaded is moved from a specific address to the address of the register 33. That data is stored in the register 33 until some later time when it is changed by another "Move" instruction. Some routines will load and reload the register 33 during a single routine.

Information stored in the processor control register helps control the processing of data in the microcomputer. The two bits, stored in the processor control register for controlling operand width, are coupled through a transmission gate multiplexer 68 to the input of a control programmed logic array (PLA) and random logic 70 where they help determine the sequence of operations performed by the microcomputer.

The two bits GB1 and GB2 of data stored in the processor control register determine how many nibbles each operand includes during the processing of each specific instruction. As previously mentioned the microcomputer is arranged to operate on operands having either 4, 8, 12, or 16 bit widths even though the on-chip data bus 24 and the arithmetic logic unit 30 include circuitry for handling only 4 bits at a time. This is accomplished by acting on the data in serial fashion, 4 bits at a time.

In FIG. 3 the arithmetic logic unit 30, in response to signals from the controller section, steps through specific operations an appropriate number of times to accommodate the various width operands. Each time the arithmetic logic unit performs one of the specified operations requiring an updating of any of the flags, resulting accurate condition information is stored in the condition register 31 and the operation is tailed in a counter 69 by a signal from the control PLA and random logic 70.

In the controller section, a comparator 71 compares the state of the counter 69 with the two bits stored in the processor control register 33 and coupled through the special address decoder 45 to the comparator 71. If the counter state does not equal the number stored in the processor control register, the controller section causes the processor including the arithmetic logic unit 30 to repeat the operation propagating any carry and updating parity, zeros, and overflow information resulting from the prior operation on that operand if necessary. When the state of the counter 69 equal the number stored in the processor control register 33, the complete operation on the multiple nibble operand is concluded and the controller section proceeds to the next phase of execution of the instruction. At that time, the condition register 31 contains accurate information relating to the flags resulting from the prescribed operation on the multiple nibble operand.

As previously mentioned, data is loaded into the processor control register 33 only occasionally during operation and typically may be loaded only once per routine or program. Once loaded, that control data remains in the processor control register and in effect determines part of the logical configuration of the processor. This control data stored in the processor control register contributes to the control of processing of data until different control data is loaded into the processor control register. The programmer controls both the loading and the subsequent reloading of the control data into the processor control register in accordance with the specific needs for solving processing problems. Thus the microcomputer logic can be reconfigured from time to time other than by routine instructions to extend the capability of its instruction set. For a more detailed description of the arrangement and operation of the processor control register, the reader should refer to a patent application Ser. No. 974,425, filed in the names of D. E. Blahut, D. H. Copp and D. C. Stanzione on Dec. 29, 1978.

A direct memory access pointer (DP) 78 in FIG. 3 is an addressable 12-bit register which is used both for direct memory access operations and as an efficient counter for counting external events. For direct memory access operations, 12 bits of data are stored therein for pointing to any memory location which is to be a source or a destination of information in the direct memory access transfer. When used as a counter for an iterative external operation, the register 78 is loaded with 12 bits of data which are incremented by the address arithmetic unit 62 during each externally generated clock cycle. In response to an overflow signal of the address arithmetic unit 62, an interrupt sequence is initiated.

A 4-bit page pointer register (PG) 80 is an addressable register that supplies the middle nibble of 12-bit addresses used for addressing the random access memory 22, the nine other addressable registers, and the input/output circuits 36, 37, and 38. By loading the page pointer register 80 and thereafter using its contents to identify a sixteen (16) nibble block of memory, any location in that block of memory addresses can be addressed very efficiently with a single instruction. The lower nibble of the address is supplied by the instruction from the read only memory 20. The upper nibble of the address is F hexadecimal and is supplied by hardware in the address arithmetic unit 62.

A 12-bit stack pointer register (SP) 82 is an addressable register used for conventional push down stack operation. Data loaded into the stack pointer is used for addressing the last information put on the stack. Under program control the data in the stack pointer is incremented or decremented by the address arithmetic unit 62 as items of information are put onto or are read out of the stack.

The input/output control register (IOCR) 35 in FIG. 1 is an addressable 6-bit register for storing, under program control, information that controls flow of data into and out of the microcomputer. Of the information stored in control register 35, 3-bits are applied to the input gate 37 and 1-bit is applied to the multiplexer (MUX) 52 for determining how data flows through gate 37 and MUX 52. Another 2-bits of the information stored in control register 35 are applied to a direct memory access and control circuit (DMA) 85 for determining whether that circuit is to control serial or parallel and input or output operations.

Addressable Accumulator Registers

As previously mentioned, there is no pre-assigned accumulator. Instead addressing modes allow registers in the random access memory 22 to function as accumulators for various instructions. By use of these registers in the random access memory, the microcomputer can accomplish a memory-to-memory data transfer for dyadic operations without any intermediate step through a permanent accumulator. These registers also function as destination and source registers for many arithmetic and logic functions.

Addressing

All of the storage locations of the read only memory 20, the random access memory 22, the input/output circuits and the previously described addressable registers are assigned locations in addressable memory space. Each address stores one nibble (4 bits wide). The address space is organized into decimal addresses 0 through 4095 or x(000) through x(FFF), wherein x indicates a hexadecimal number. Read only memory occupies the lower addresses starting with address x(000), and random access memory occupies the high addresses ending at x(FFF). The ten addressable registers and the input/output circuits are assigned addresses below the lowest address assigned to random access memory and are addressable like random access memory. Each random access memory location used for the registers have an address wherein the high nibble is F hexadecimal.

There are a variety of addressing modes for forming effective addresses of operands. There are four modes for developing destination addresses and four additional modes for developing source addresses.

The destination addressing modes are:
Mode 0—address is formed by concatenating the 4-bit numeral F hexadecimal with a 4-bit page pointer fetched from the page pointer register 80 and with a nibble provided by the instruction;
Mode 1—direct address;
Mode 2—address is the contents of the memory pointer register 64;
Mode 3—address is the contents of the memory pointer register 66.

The source addressing modes are:
Mode 0—address is formed by concatenating the 4-bit numeral F hexadecimal with the 4-bit page pointer fetched from the page pointer register 80 and with a nibble provided by the instruction;
Mode 1—direct address;
Mode 2—address is the contents of the memory pointer register 64;
Mode 3—immediate data.

The special address decoder 45 receives addresses applied by the address latches 99 through the address bus 40. This decoder converts 12-bit special addresses to specific signals for accessing the condition register 31, the processor control register 33, the input/output control register 35, the input/output latches 36, the bidirectional input/output port 37, the inport 38, the program counter 60, the memory pointer registers 64 and 66, the direct memory access pointer register 78, the page pointer register 80 and the stack pointer register 82 to signals which identify and activate the appropriate register, as required during execution of a program.

Other Registers

Other registers in the microcomputer include the instruction register (IR) 32 and the destination/source register (DS) 86.

In FIGS. 2 and 5, the instruction register 32 is a 4-bit latching circuit which is coupled to the on-chip data bus 24 for receiving and storing one nibble of opcode at a time during the execution of each instruction. The first nibble of each instruction is always stored in the instruction register. While that nibble of opcode is stored, the instruction register 32 applies that code to an instruction register decoder and latches 90 within the controller section for partially controlling the sequence of operations during execution of the current instruction.

Referring now to FIGS. 2 and 6, information produced by a logic circuit in FIG. 6, in response to selected ones of the possible first nibbles of opcode is stored for the duration of the instruction in the latches ELAT and MDLAT in the instruction register decoder and latches 90 for indicating that an additional nibble of opcode is to be used. The second nibble of each instruction is always stored in the destination/source register 86 of FIGS. 2 and 5. For a group of often used instructions, the first and second nibbles provide sufficient information to prescribe the desired execution sequence.

In response to the information stored in the latches ELAT and MDLAT of the instruction register decoder and latches 90, some instructions fetch a third nibble of the instruction (the second nibble of opcode) from memory and store it in the instruction register 32 in place of the first nibble of opcode. This second nibble of opcode continues partial control of the sequence of operations for the duration of that instruction. Such storage of a first opcode in the latches ELAT and MDLAT, followed by a second opcode replacing the first opcode in the instruction register for continuing partial control of the sequence of operations, is referred to as a double opcode operation. In any instruction using the double opcode operation, the third nibble of the instruction is the second opcode which is stored in the instruction register 32 in place of the first opcode.

In FIG. 6, the instruction register decoder and latches 90 includes two latches (ELAT and MDLAT) 630 and 610 for storing the information generated by a set of NAND gates in response to one of the specific codes of the first nibble of opcode stored in the instruction register 32. The latches ELAT and MDLAT are each set in response to a different opcode combination indicating double opcode operations. If the assigned opcode for either of these two latches is not stored in the instruction register 32 during the first nibble of any instruction, that latch remains reset for the entire instruction. On the other hand, if the assigned opcode for one of these latches is stored in the instruction register during the first nibble, that latch is set for the duration of that instruction. Once a latch ELAT or MDLAT is set, it causes the controller section to fetch a second nibble of opcode from read only memory 20 and to reload the instruction register 32 with that second nibble replacing the first nibble. The set state of the latch ELAT or MDLAT together with the second nibble of the opcode stored in the instruction register 32 subsequently controls processing of any data word to be fetched from any addressable storage location. Once either of the latches is set in the instruction register decoder and latches 90, it causes the controller section to step the processor through special steps. A more detailed description of the arrangement and operation of the microcomputer in response to double opcode instructions is included in the aforementioned patent application in the names D. E. Blahut et al, entitled "Microcomputer Using Double Opcode Instructions" and filed concurrently herewith.

As shown in FIGS. 2 and 5, a destination/source register 86 is a 4-bit latching circuit which is coupled to the on-chip data bus 24 for receiving and storing one nibble of addressing mode data during the execution of each instruction. As previously mentioned, the second nibble of each instruction is the nibble which is stored in the destination/source register 86 and is applied to the transmission gate multiplexer 68 for the duration of the current instruction. Two bits of this data coupled through the multiplexer 68 when taken together with information stored in page pointer register 80 are used by the control programmed logic array 70 for determining which one of 16 addresses in a block is to be used as a destination during execution of the current instruction. The other two bits of data from the destination/source register 86 and coupled through the multiplexer 68 when taken together with the information from the page pointer register 80 are used by the programmed logic array 70 for determining which one of the 16 addresses in the block is to be used as a source register during the execution of that same instruction if it is a dyadic instruction. If the instruction is other than a dyadic instruction, these latter two bits of data provide other control information for the control section.

The instruction register decoder and latches 90, as shown in FIG. 6, also includes two other flip-flops 610, 630 for storing information generated by a logic circuit 603, 623 in response to specific codes stored in the instruction register 32. Each of these flip-flops is set in response to a different opcode combination. One of the flip-flops 610 when set stores an indication that the instruction is either a monadic or a dyadic instruction. The other one of the flip-flops 630 stores an indication that the instruction is a conditional transfer instruction.

Controller Section

As shown in FIG. 2, the controller section of the microcomputer includes the read only memory 20 and the registers 32, 33, and 86 coupled to the on-chip data bus 24. Also the controller section includes the control programmed logic array and random logic 70, a state counter 96, the instruction register decoder and latches circuit 90, and a variety of additional logic circuitry. The sequence of events executed for an instruction is controlled by the controller section. Outputs from the control programmed logic array are latched in a master/slave arrangement. The microcomputer is stepped through a series of states which are represented by rectangles including symbols in FIGS. 8 and 9 which are arranged as shown in FIG. 7.

Figure 9:
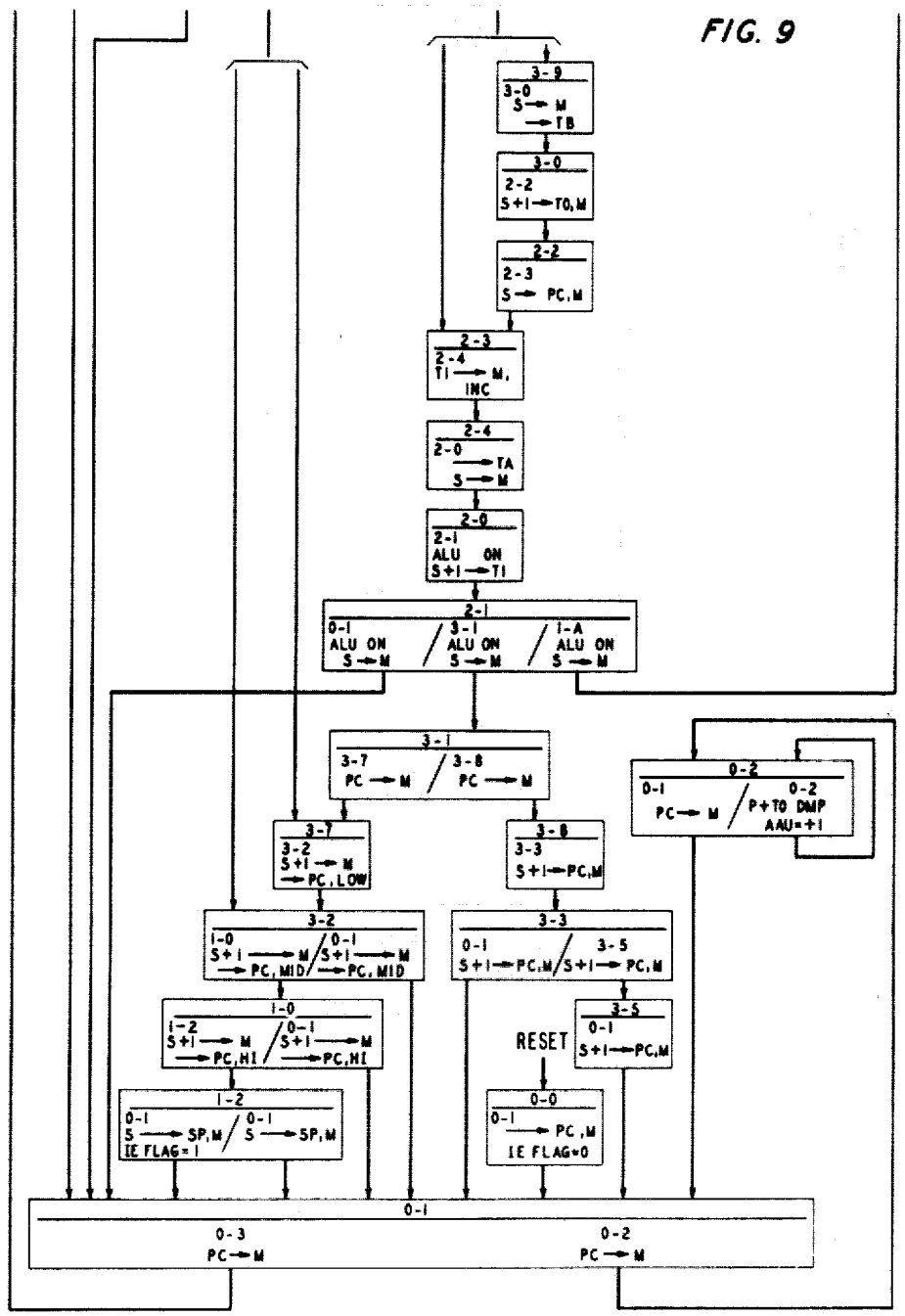

In FIGS. 8 and 9, each state is identified by a code at the top of rectangle, e.g., "0-3" and "0-C" located at the tops of the uppermost two rectangles. Each state is determined in sequence by the output of the state counter 96 shown in FIGS. 2 and 10.

During a fetch sequence of operation, two nibbles are fetched from memory and are loaded respectively into the instruction register 32 during state 0-3 and in the destination/source register 86 during state 0-4. The first nibble is the opcode which is used for basic control of the sequence of subsequent events. The second nibble contains destination and source address formation for operands to be used in executing the instruction. Every time the source/destination register 86 is loaded by a control signal LDDS, the register 28 also is loaded. As mentioned for some operations, a third nibble is fetched and is loaded into the same instruction register during state 0-5 for controlling some other sequences of subsequent events. More details are presented in the aforementioned patent application D. E. Blahut et al 7-3.

After the fetch sequence is completed, an execution vector generated by the instruction register decoder and latches circuit 90 may be loaded into the state counter 96 so that the proper sequence of subsequent processing events is commenced. A multiplexer (MUX) 97 in FIGS. 2 and 10 determines whether information from the instruction register decoder and latches circuit 90 or from the control programmed logic array 70 is applied to the state counter 96.

Figure 10:
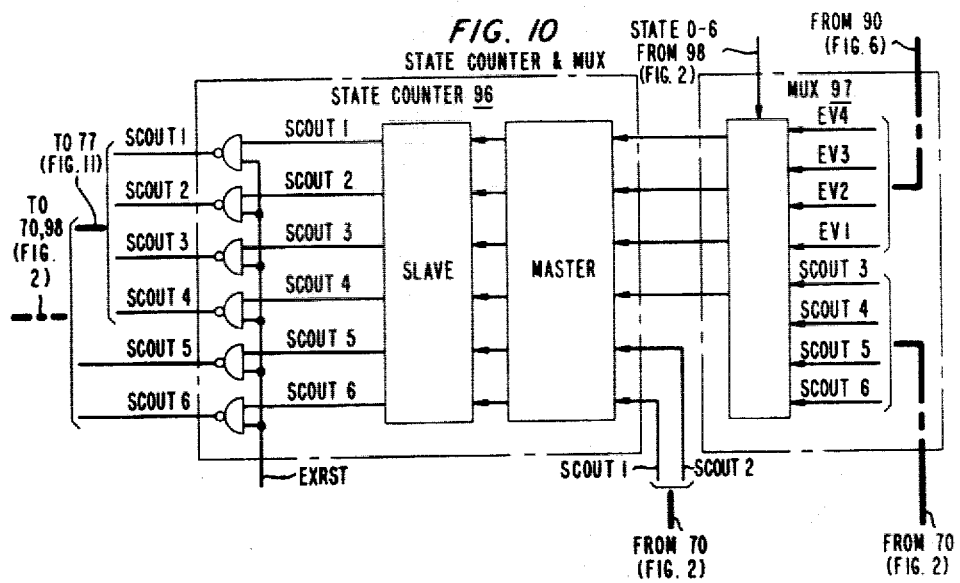
FIG. 10 is a logic schematic of a state counter and multiplexer.

As shown in FIGS. 2 and 10, the state counter is a 6-bit master/slave latch which temporarily retains state information typically generated by the control programmed logic carry 70 but at certain times as modified by the execution vector information which is multiplexed, or jammed, into the state counter in lieu of the information from array 70. These times are determined by the decoder 98 which is responsive to the state of the state counter 96. When the state 0-6 occurs, decoder 98 applies a signal to the multiplexer (MUX) 97 for applying the execution vector to the state counter rather than the usual four outputs of the control array 70.

If the instruction is a monadic or dyadic instruction, one or more address pointers are formed and are loaded into one or both of a pair of temporary addressing registers (T0 and T1) 92 and 93 of FIG. 3. Once the addresses are formed, the controller initiates fetching the specified operands from storage and loading them into one or more of the arithmetic logic unit registers 26 and 27. The arithmetic logic unit 30 is then activated to execute the appropriate function and generate a result. Condition flags are set in the condition register 31 in accordance with the results of the arithmetic logic unit operation as processed by the condition steering circuit 54. The comparator 71 of the controller then decides whether or not the arithmetic logic unit 30 should operate on another nibble of operand. This is accomplished by comparing the state of the counter 69 with the operand width stored in the processor control register 33. If another nibble of the operand is to be processed, the controller section fetches an additional nibble or nibbles and activates the arithmetic logic unit an appropriate number of times. This type of operation continues during the execution of each instruction until the number of nibbles processed equals the number representing the operand width as stored in the processor control register 33.

Control Programmed Logic Array

The control programmed logic array 70 of FIG. 2 is an arrangement of logic circuits which perform the logic of a known programmable logic array, such as one described in *Signetics Applications Notes RE PLAs*, Signetics, Inc., July 1975, pages 4–22. As shown in FIGS. 2 and 10, the control programmed logic array 70 has two outputs which are looped through the state counter 96 back to inputs of the array and four which are looped through the multiplexer 97 and the state counter 96 back to inputs of the control programmed logic array for stepping the array through sequences of states during operation of the microcomputer.

As shown in FIGS. 2 and 10, the multiplexer 97 is an 8-to-4 multiplexer. The arrangement and operation of such a multiplexer is well known and may be reviewed by reference to pages S-296 and S-297 of the *Supplement to the TTL Data Book for Design Engineers*, first edition, Texas Instruments, Inc.

As shown in FIGS. 2 and 10, state counter 96 is a master/slave latch having six inputs and six outputs. Two of the inputs SCOUT 1 and SCOUT 2 are applied directly from outputs of the control programmed logic array. The four other inputs are applied from MUX 97. Normally the four inputs from MUX 97 are four additional outputs SCOUT 3–SCOUT 6 from the control programmed logic array. Only during state 0-6 do those four inputs switch over to four execution vector outputs EV 1–EV 4 from the instruction register decoder and latches 90.

An additional input lead from a chip terminal applies an external reset signal EXCRST to the state counter when a user desires to reset the microcomputer. Applying the reset signal forces the output of the state counter to all zeros. Such output will initiate a reset routine.

Figure 11:
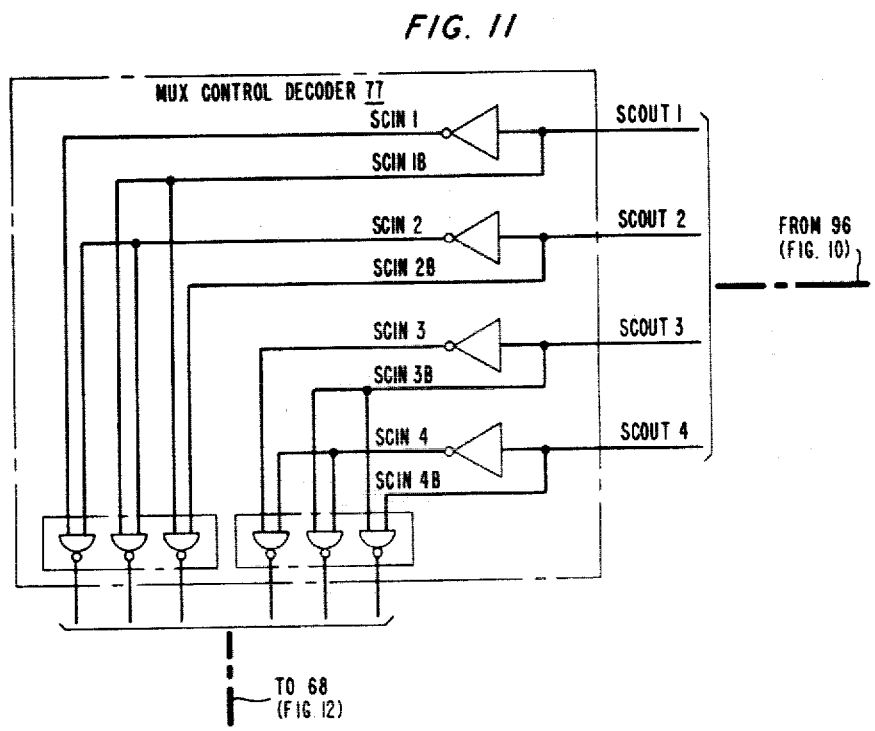
FIG. 11 is a logic schematic of a decoder.

As shown in FIGS. 2 and 11, the multiplex control decoder circuit 77 includes two sets of logic gates which produce control signals for two sets of transmission gate multiplexers in the multiplexer 68 of FIGS. 2 and 12. Each of these sets of multiplexers includes three transmission gates which are opened and closed by the states of control signals. Only one out of the three gates of each set is closed for transferring information at any one time. Although the operation of the multiplexer 68 is described in greater detail hereinafter, the following briefly describes its operation. Each gate of the first set of transmission gates A0, A1 and A2 in the multiplexer 68 controls the transfer of two pieces of information to a pair of inputs of one transmission gate A of the second set of gates in the multiplexer 68. Each gate of the second set of transmission gates A, F and E2 controls transfer of either three or four pieces of information to four input leads of the control programmed logic array 70.

Execution Vector Logic

As shown in FIGS. 2 and 6, the instruction register decoder and latches 90 is interposed between the instruction register 32 and the state counter 96 in the controller section. Inputs are applied from the instruction register, the control programmed logic array and from an execution vector state decoder 98. Part of the resulting output from the instruction register decoder and latches 90 is called an execution vector. The execution vector includes four bits EV1-EV4, which determine how to execute the current instruction and how to process the current operand. The execution vector is multiplexed with part of the outputs of the control programmed logic array 70 and is loaded into the state counter 96 at a predetermined time during state 0-6 of the execution of an instruction.

Once loaded into the state counter, the execution vector determines which one of the states defined in FIGS. 8 and 9 is executed thereafter. Each state loaded by way of the execution vector is identified in FIGS. 8 and 9 by the symbol X at the top of the state. This entire execution vector operation enables a large fan out through branches in the sequence chart without requiring an inordinately large chip area for the controller section shown in FIG. 2. By jamming the execution vector into the state counter, many inputs and word lines which otherwise would be required in the control programmed logic array 70 have been eliminated.

As previously mentioned, the execution vector is multiplexed into the state counter alternatively with part of the outputs from the control programmed logic array 70. The execution vector state decoder 98, responsive to the state of the state counter 96, identifies the correct time (state 0-6) at which the execution vector should be jammed into the state counter in lieu of the outputs from the control programmed logic array. An appropriate enabling signal is applied from the decoder 98 to the multiplexer 97. The resulting state thus jammed into the state counter determines which branch of the sequence chart is executed during the rest of the current instruction.

Address Arithmetic Unit, Address Latches and Address Bus

Figure 14:
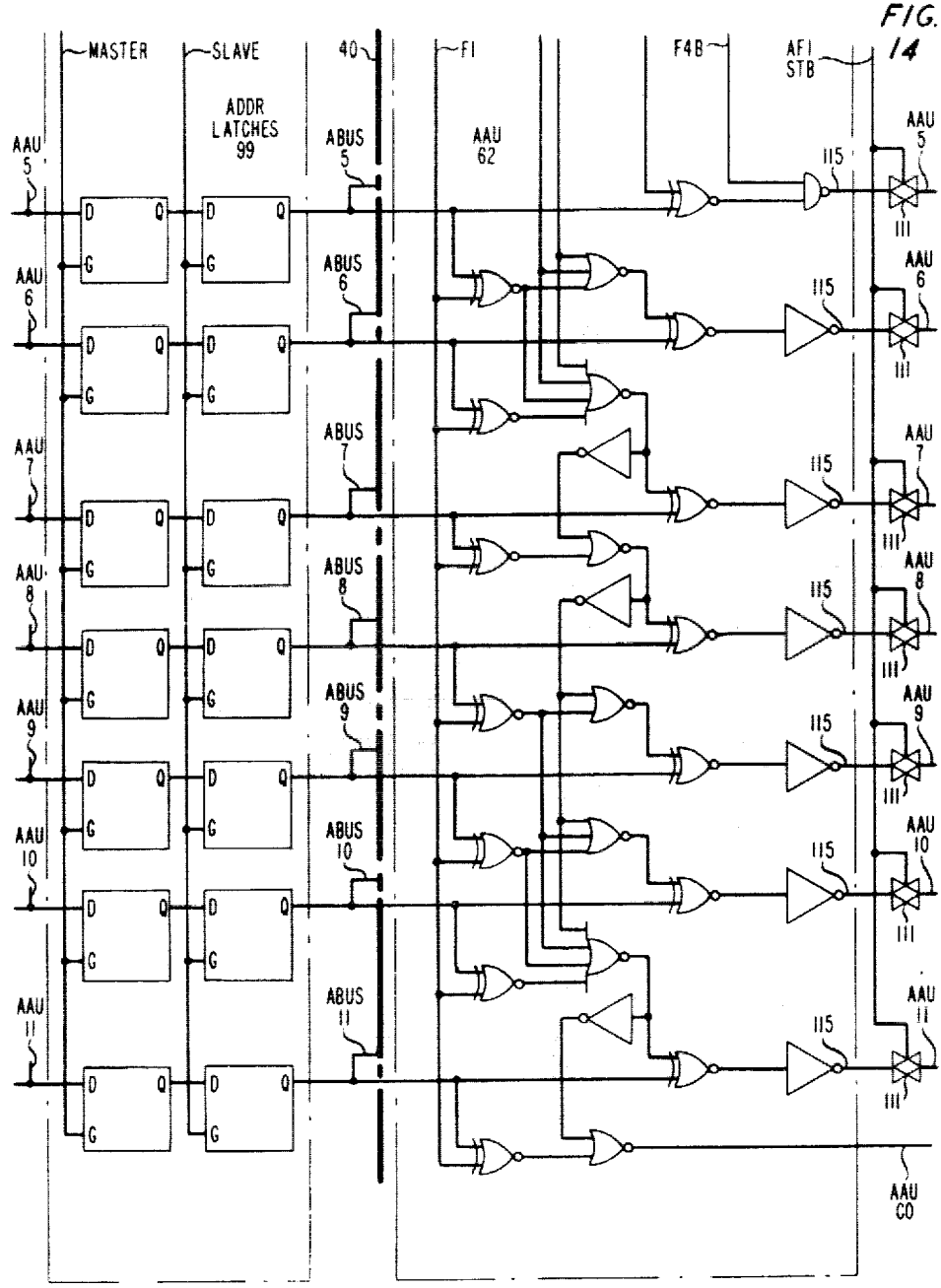

In FIGS. 3, 13 and 14, the address arithmetic unit 62 is a 12-bit parallel arithmetic unit arranged for incrementing or decrementing by one any information applied to its input from an address latch circuit 99. Unit 62 is a combinational logic circuit dedicated to address functions.

In addition to basic incrementing and decrementing functions, the address arithmetic unit 62 is arranged to perform three other operations. The five functions are controlled in response to three control signals F0B, F1B and F4B from the control PLA and random logic circuit 70. First of all in response to an NOP code, the unit 62 does nothing. Additionally, it generates either a trap address or an interrupt address, respectively, in response to trap and interrupt codes. These trap and interrupt addresses are generated by first resetting the address data to all zeros in the address latches 99, by gating the masters while the transmission gates 111 are disabled, and thereafter processing the all zeros through the address arithmetic unit while jamming a bit into a selected bit position. Such bit jamming is accomplished by applying signals to leads F0B, F1B and F4B. This generates the address x(020) for an interrupt routine and the address x(010) for trap.

As shown in FIGS. 3, 13 and 14, address latches 99 are a set of 12 parallel master/slave flip-flop circuits, arranged to receive and store temporarily address data presented on an address arithmetic bus 100. Data on the bus 100 arrives there from either (a) the data bus 24 by way of a multiplexer 102, (b) registers 60, 64, 66, 78, 80, 82, 92 and 93 or (c) the address arithmetic unit 62. An address stored in the masters of the address latches is transferred into the slaves where it is applied to the address bus 40. The transfer of addresses from masters to slaves occurs once every machine cycle.

Address bus 40 is a 12-bit parallel bus for applying any address stored in the slaves of the address latches 99 to inputs of the special address decoder 45 and the address arithmetic unit 62. The address is applied also to the address inputs of the read only memory 20, the random access memory 22 and a 12-input to a 1-out-of-16 decoder 106 associated with the input/output latches 36.

Address Arithmetic Bus Structure

As shown in FIG. 3, the address arithmetic bus 100 is a twelve-lead bus interconnecting the address arithmetic unit (AAU) 62, the address latches 99, the registers in internal random access memory (IRAM) 61, the registers in temporary random access memory (TRAM) 73 and the multiplexer 102.

Some addresses are formed in the microcomputer by concatenating three nibbles of data from the data bus 24. These nibbles originate by reading them out of the read only memory 20 or out of the random access memory 22. They appear serially by nibbles on the data bus 24 and are concatenated by writing them into their respective nibble positions in one of the registers in memory 61 or memory 73.

The address arithmetic bus 100 and the connected circuits are arranged to generate memory addresses used in processing data in the microcomputer. Sets of transmission gates 111, 112, 113 are interposed in the bus leads so that the bus is separable into segments. Depending upon control signal applied to the transmission gates 111, 112 and 113 and to the multiplexer 102, bus segments 115, 116, 117 and 118 are opened selectively from one another so that simultaneous transfers of data from separate sources can occur through different segments. Such simultaneous data transfers enable a saving of operating time while accomplishing some processing functions.

Special Address Decoder

The special address decoder 45 of FIG. 3 includes circuitry for providing address decoding for the registers 31, 33, 35, 60, 64, 66, 78, 80 and 82. Upon detection of the address for registers 31, 33 and 35, the special address decoder enables input/output logic signals which control the read/write operations of those registers. Once decoded in the special address decoder 45, the addressing of the registers 60, 64, 66, 78, 80 and 82 is controlled by other signals from the decoder 45. Signals on control lines 122 in FIG. 3 determine which four of twelve gates in the multiplexer 102 are activated at any time. They enable transfers of data serially by nibbles from the data bus 24 to one of three sets of 4 leads of the address arithmetic bus 100 and vice versa.

Decoder 45 circuitry of FIG. 3 also provides address decoding for the input/output latches 36, the bidirectional input/output bus transmission gate 37, the inport transmission gate 38 and the programmed logic array encoder 39 of FIG. 1.

When the registers 31, 33, 35, 60, 64, 66, 78, 80 and 82 are addressed as a destination in the direct addressing mode and when the latches 36 and the transmission gates 37 and 38 are addressed as a destination, the special address decoder 45 overrides the processor control register 33 and controls the appropriate number of nibbles to be transferred.

The special address decoder 45, the control programmed logic array 70, the address arithmetic unit 62, the address latches 99 and parts of the central control arrangement automatically generate a sequence of addresses in response to information derived from a single special address. The sequence of addresses are multiple destinations for both monadic and dyadic instructions. More details of the special address decoder 45 are presented in the aforementioned patent application, Ser. No. 71,717, filed in the name of V. K. Huang.

Figure 16:
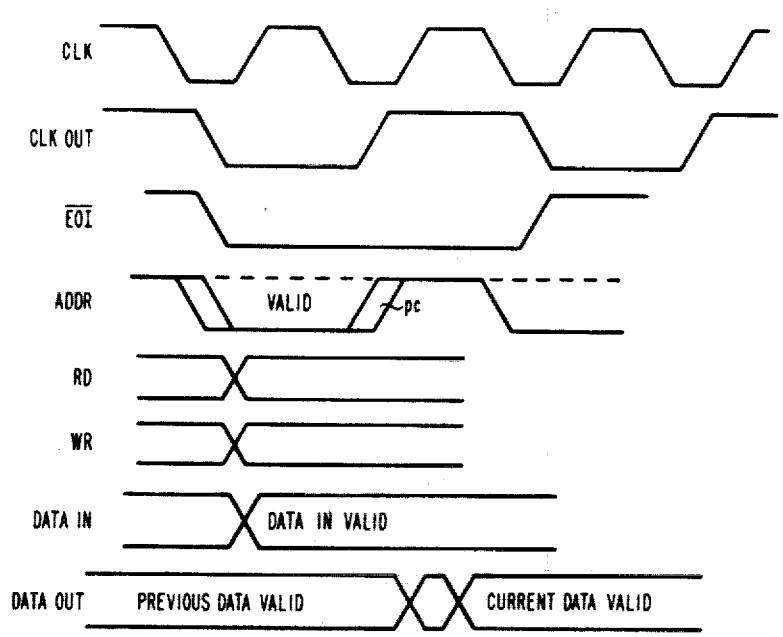
FIG. 16 is a timing diagram for the microcomputer of FIGS. 1-3.

Referring now to FIG. 16, the timing program shows the relationships among several signals occurring during operation of the microcomputer of FIGS. 1, 2 and 3.

The signal CLK is applied from an external source to the circuit of FIGS. 1, 2 and 3 for determining relative timing of operations performed by the microcomputer.

Signal CLK OUT is a timing signal produced by the controller for enabling various circuits within the microcomputer and various off chip peripheral circuits which may be connected to the microcomputer.

An end of instruction signal EOI is a control signal produced by the controller to indicate the termination of a sequence of events that are known as an instruction.

A waveform designated ADDR represents when during the performance of an instruction the address on address bus 40 is valid. Associated read and write signals RD and WR also are shown at an appropriate time while the address is valid.

The signal RD is produced by the controller section of FIG. 2 for enabling a read operation from either the read only memory 20, the random access memory 22 or IRAM 61.

Signal WR produced by the controller section enables writing into either the random access memory 22, the input/output latches 36 or IRAM 61.

Signal DATA IN represents data read into the microcomputer from a peripheral device. Such data should be valid at the time shown.

Signal DATA OUT represents data read out of the microcomputer to a peripheral device. Such data will be valid at the time shown for current data in the waveform DATA OUT.

Now that the circuitry and timing of the machine have been described, the advantageous operation thereof can be appreciated by the following description of illustrative operations. For these operations, it is assumed without discussion that the read only memory 20, the random access memory 22, and the peripheral devices B, C, D, and E are storing valid information that includes a legitimate program for the machine. The read only memory 20 stores a program start up sequence in a block of addressable memory commencing at a hexadecimal address x(000). Storage of information in registers will be described as required subsequently. It is further assumed that the machine has been reset putting the address x(000) into the program counter (PC) and into the address latches.

Exemplary Operation

Referring now to FIGS. 8 and 9, there is shown a sequence chart, or state diagram, for the illustrative operations of the machine. Each block in the sequence chart represents a state of the main control logic array and shows functions that occur during a specific machine cycle of an illustration. It is believed that the reader will better understand the operation of the processor by referring to the sequence chart while studying the illustrative operations subsequently described.

For any direct memory access arrangement, a peripheral device, such as one of the peripherals B, C, D and E, is interconnected with the microcomputer through terminals on the chip. Such peripherals are designed to interact with the microcomputer through a group of control signals called a direct memory access request signal DMA REQ, a direct memory access acknowledge signal DMA ACK, and an asynchronous clock signal ASYN CLK. The signal DMA REQ is generated by the peripheral device. The signal DMA ACK is sent to the peripheral devices from the microcomputer. The peripheral devices produce the clock signal ASYN CLK in the correct number of pulses upon receiving the signal DMA ACK. In addition to the arrangement for control signals, the peripheral device includes a data path for either receiving or sending data.

Figures 17, 22:
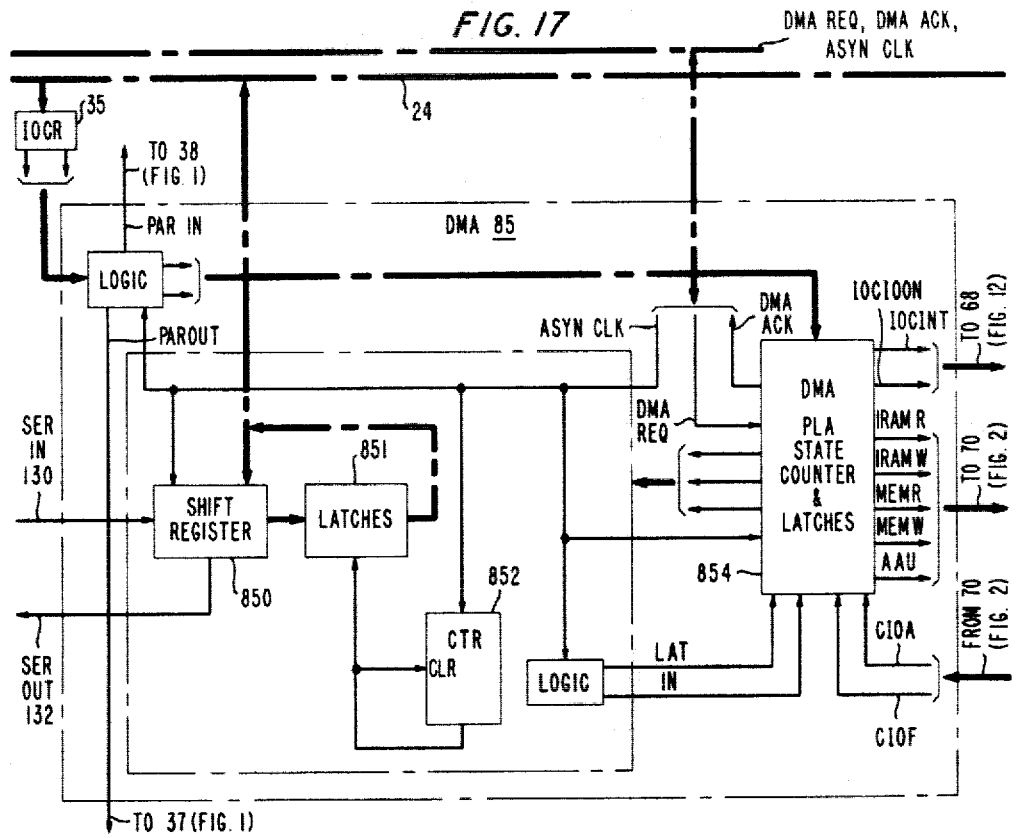
FIG. 17 is a block diagram of a direct memory access circuit for the microcomputer of FIGS. 1-3.
FIG. 22 is a timing diagram for a direct memory access operation.

Referring now to FIG. 17, there is shown a block diagram for the direct memory access circuit 85 and its interconnections with other circuits of the microcomputer. Included are a combination of a shift register 850 and a set of latches 851. The shift register and the latches 851 both include four stages. A serial data input chip terminal SER IN is connected to a data input to a first stage of the shift register. A serial data output chip terminal SER OUT is connected to a data output from the last stage of the shift register. Four leads from the data bus 24 are gated in parallel to inputs of the four stages of the shift register. Output terminals from all four stages of the shift register are gated in parallel to inputs to related ones of the latches 851. Four output terminals from the latches are gated in parallel to the data bus 24.

A chip terminal ASYN CLK is connected with the shift register and a counter 852 for applying asynchronous clock signals from a peripheral device. These clock signals cause data to shift in the shift register and increment the counter 852.

Also included in the circuit 85 is a direct memory access controller 854 which includes a programmable logic array and a state counter connected in a feedback loop arrangement and which also includes some latching circuits. Controller 854 receives four inputs from the input/output control register 35 and exchanges control signals with logic circuitry associated with the shift register 850, latches 851 and counter 852 as well as with the main control PLA and random logic 70. Controller 854 also produces read and write signals for controlling the internal random access memory 61 and the memories 20 and 22. Signals AAU INCR and AAU ENAB are generated for controlling the address arithmetic unit.

In the first illustrative operation, we will describe a direct memory access procedure for parallel input from the peripheral device B to the microcomputer. Other peripherals shown in FIG. 1 are shown for other purposes and may be omitted from any arrangement for parallel input direct memory access operation. Prior to describing the procedure, it is necessary to first prepare the microcomputer for the procedure. In preparation information is stored in the input/output control register 35 and in direct memory access pointer register 78.

Information is to be stored in the direct memory access pointer register 35 by an instruction MOV. As a result of such instruction, data from address locations x(111), x(112) and x(113) is moved to the direct memory access pointer register which is assigned addresses commencing at address x(F08). The latter address is the address of the low order nibble of the register 78. This is a special address that is decoded by the special address decoder 45 which controls transfer of three nibbles of immediate data into the register 78.

Figure 19:
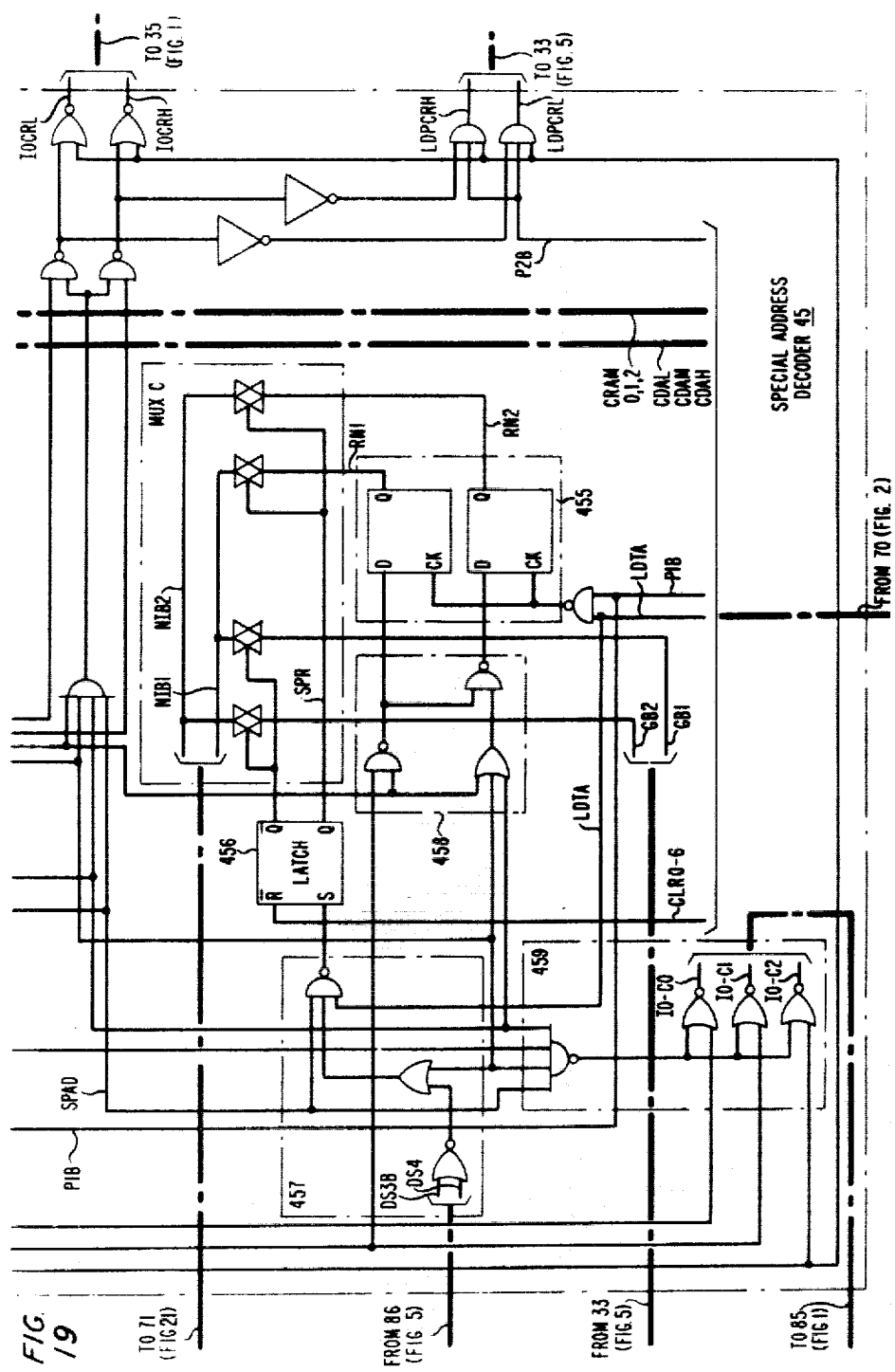

Referring now to FIGS. 18 and 19, there is shown a logic schematic of the special address decoder 45. Leads from the address bus ABUS 00 to ABUS 11 are applied from the upper left and are latched for the most part. In FIG. 18 there is a pair of multiplexers MUX A and MUX B, one of which provides addresses which are decoded into signals for enabling each of the special registers and the other of which provides control signals for the multiplexer 102. In FIG. 19 there is a nibble priority circuit which decides whether the number of nibbles in an operand is determined by information stored in the processor control register 33 or by a special address.

After stepping through the program start up routine, the microcomputer is ready to process an illustrative instruction MOV to DP. For the instruction MOV to DP, the three nibbles of data are fetched from the read only memory 20 of FIG. 2 and are transferred through the data bus 24 to the temporary register 27. The data goes through the arithmetic logic unit 30 without alteration and is applied back through the data bus and the multiplexer 102, controlled by decoder 45, to the address arithmetic bus 100 from which it is written into the register 78. There it is stored until the illustrative operation commences. In the detailed sequence of operations to follow, several wait states are present to allow the control PLA to decode the proper information for the next operation.

The first state of the processor operation is state 0-3. The first nibble of the instruction from the address x(10D) held in the slaves of the address latches is fetched from the read only memory 20 and is transferred through the data bus 24 to the instruction register 32. The first nibble of information stored in the instruction register is the opcode representing the instruction MOV, which will move an initial address for direct memory access into the register 78. During this state, the processor also increments the address held in the slaves of the address latches and stores the result x(10E) in the program counter register 60 and in the master of the address latches 99. The processor then steps to state 0-C.

State 0-C is a wait state. The information in the slaves of the address latches merely is transferred to the masters thereof, and the processor steps on to state 0-4.

In state 0-4 the second nibble of the instruction from the address x(10E) in the slaves of the address latches is fetched from the read only memory 20 and is transferred through the data bus to the destination/source register 86. Simultaneously the opcode is decoded and the latches MDLAT and ELAT are operated. For the instruction MOV, a special dyadic instruction, MDLAT and ELAT remain reset. A decision is made whether or not to fetch a second opcode, based on the state of the latches MDLAT and ELAT. For this instruction, no second opcode is fetched. The two bit destination and source code specifies direct addressing and immediate data respectively. The address in the slaves of the address latches again is incremented. The incremented address is stored in the program counter register 60 and in the masters of the address latches. Since a second opcode is not required for the instruction MOV, the processor steps to state 0-6.

In state 0-6, a wait state, the address in the slaves of the address latch is transferred to the masters thereof and the processor steps to state 1-F.

At this point in the execution of the instruction, the opcode has been fully decoded and the instruction identified. Address formation now begins. For dyadic instructions, the destination address is formed first.

In state 1-F, the processor fetches from the internal random access memory 61, the upper nibble of the address x(F08) for the direct memory access pointer register 78. This nibble is stored in the upper nibble of the temporary register 93, which has been designated by the data stored in the destination/source register 86. The processor then steps to state 1-B.

In state 1-B, the address in the program counter 60 is loaded into the masters of the address latches for pointing to the next nibble of the program, which is the low nibble of the address x(F08) for the register 78, the destination. The machine steps on to state 1-7.

In state 1-7, the third nibble of the instruction, i.e., the low nibble of the address x(F08), is fetched from the read only memory through the data bus 24 and the address arithmetic bus segment 118 to the low order nibble of the temporary register 93. The address in the slaves of the address latches is incremented in the address arithmetic unit 62 and the resulting incremented address is stored in the program counter and in the masters of the address latches. The processor steps to its state 1-9.

In state 1-9 the fourth nibble of the instruction, i.e., the middle nibble of the address x(F08), is fetched and stored in the middle nibble of the register 93. This completes the formation of the destination address, i.e., the address of the direct memory access pointer register 78, in the temporary register 93. The address in the slaves is incremented in the address arithmetic unit, and the result is stored in the program counter and in the masters of the address latches. The processor steps to its state 1-A.

In state 1-A the contents of the temporary register 92 is transferred into the masters of the address latches. This address is meaningless with respect to the program being executed. Since the instruction register contains information indicating that the instruction is a dyadic instruction and the flip-flop D (FIG. 6) is reset to zero, the processor steps to state 1-D for initiating formation of a source address in the temporary register 92. The source address is a direct address of immediate data in the read only memory 20.

In state 1-D the address in the temporary register 92 is transferred to the masters of the address latches, and the flip-flop D (FIG. 6) is set so that the next time through state 1-A the processor will not loop back through state 1-D. This is a wait state. The processor steps on to its state 1-F.

Since the source mode is immediate, the address stored in the program counter is transferred to the temporary register 92. This address points to the fifth nibble of the instruction, which contains the first nibble of the source operand. This source operand is an address which is to be stored in the direct memory access pointer register 78 and which gives the initial storage location for a direct memory access operation. Because this is the formation of the source address for immediate data, the processor steps to state 1-A.

Now the processor is ready to commence fetching the source operand. In state 1-A, the address being stored in the temporary register 92 is transferred to the masters of the address latches. This is the address of the fifth nibble of the instruction, i.e., the first nibble of immediate data. This address x(111) is the address from which the initial address for direct memory access is obtained. Such immediate data is obtained because the opcode indicates a dyadic instruction and the flip-flop D (FIG. 6) already is set. The processor steps to state 3-9.

In state 3-9, the contents of address x(111) is fetched from the read only memory and is transferred through the data bus to the temporary data register 27. The special address circuitry and the nibble override circuitry of FIGS. 18 and 19 are inactive because the source address is not a special address. Because this is a source, the data in the register 33 determines the number of nibbles to be processed. The address in the slaves of the address latches is transferred through the address arithmetic unit to the masters. The processor goes on to state 3-0.

In state 3-0, the address arithmetic unit 62 is enabled to increment the address in the slaves and store the resultant in the temporary register 92 and in the masters. This incrementation is performed in anticipation of a multiple nibble operand. The processor now steps on to its state 2-2.

In state 2-2, the incremented address, stored in the slaves of the address latches, is transferred to the program counter register 60 and to the masters in anticipation that the last arithmetic logic unit operation has been performed for the current instruction. Thus the address in the program counter points to the first nibble of the next subsequent instruction. The processor steps on to state 2-3.

In state 2-3 the 12-bit address x(F08) contained in the temporary register 93, which is the address of the low order nibble of the direct memory access pointer register 78, is transferred all at once through the bus 100 into the masters of the address latches 99. Since the address is for the low order nibble of the register 78, it is a special address which sets flip-flop 450 in FIG. 18 and thereby activates the special addressing circuits of FIGS. 18 and 19. The low nibble of the register 78 is addressed by way of control lines DP and DAL. Control line SPAD is high, and signals from the destination/source register 86 indicate direct addressing for the destination mode. At this time the nibble override circuit of FIG. 19 is prepared to override the nibble setting of register 33 as applied over leads GB 1 and GB 2 but it needs an enabling signal on the control line LDTA. A signal from the controller 70 increments the controller counter 69 to indicate that the arithmetic logic unit operation on one nibble of the operand is about to be completed. The processor steps to its state 2-4.

In state 2-4, the destination operand is fetched from the low order nibble of the register 78 and is transferred by way of the bus 100 and data bus 24 into the temporary data register 26 enabling signal LDTA and thereby activating the nibble override circuit of FIG. 19. Multiplexer MUXC now switches from its inputs GB1 and GB2 to the special address inputs RN 1 and RN 2. Since the special address is the register 78 and it includes three nibbles, the nibble override multiplexer MUX C remains switched this way until the end of the execution of this instruction when the signal CLR 0-6 from the control PLA 70 clears the latch circuit 456. The address of the low nibble of the register 78, residing in the slaves of the address latches, is transferred to the masters and the processor steps to stage 2-0.

In state 2-0, the destination address stored in the slaves of the address latches is incremented to x(F09) and stored in temporary address register 93 in anticipation of a multiple nibble operation. The arithmetic logic unit 30 is turned on with controls such that the data in the temporary register 27 appears unaltered at the output of the arithmetic logic unit. The operand stored in register 26 does not affect the output of the arithmetic logic unit during this state for this illustrative instruction. The processor steps on to its state 2-1.

In state 2-1 the arithmetic logic unit is held on and its output is transferred through the data bus, the multiplexer 102 and bus 100 into the location addressed by the slaves of the address latches. This is the address x(F08) of the low nibble of the direct memory access pointer register 78. The address x(F08) in the slaves of the address latches is transferred to the masters thereof.

Figure 21:
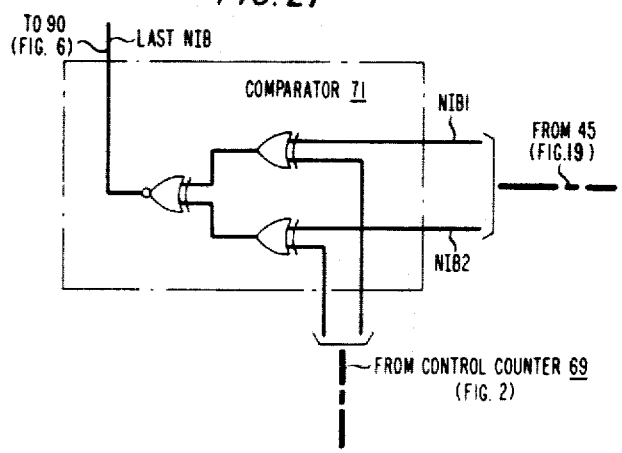
FIG. 21 is a logic schematic of a comparator.

At the end of the just described arithmetic logic operation, the comparator 71 of FIGS. 2 and 21 compares the state of the control counter 69 with the number of nibbles presented by the nibble override circuit of FIG. 19. Since the destination is a three nibble register, the override circuit is calling for a three nibble operation and only one nibble has been completed. The processor steps on to state 1-A.

The operand fetch and arithmetic logic unit operations now are repeated twice from state 1-A through states 3-9, 3-0, 2-2, 2-3, 2-4, 2-0 and 2-1. There are some differences, however.

When the address is read from the temporary register 92 for the first repeat of state 1-A, the address is x(112). The operand fetched from that address in read only memory is subsequently loaded in the middle nibble of the register 78 by way of the middle leads of bus 100 and under control of signal DAM. The address for such middle nibble of the register 78 is generated automatically by the address arithmetic unit 62 and is stored in the register 93, during state 2-0, in response to signals produced by the special address decoder 45, the controller counter 69, the comparator 71 and the control programmable logic array 70.

When the address is read from the temporary register 92 for the second repeat, the address is x(113). The operand fetched from there is loaded into the high order nibble of the register 78 by way of the high order leads of bus 100 and under control of signal DAH. The address for the high order nibble of the direct memory access pointer register 78 also is generated automatically by the same combination of circuitry. Upon completion of these steps the register 78 contains the initial address for the illustrative direct memory access operation.

Throughout these latter two loops used for loading the operand into the middle and high order nibbles of the direct memory access pointer register, the nibble override circuit of FIG. 19 is active and calling for a three nibble operation. The comparator 71 of FIGS. 2 and 21 now checks its inputs from the nibble override circuit and the number of operations counted by counter 69. The comparator is satisfied producing a special address disabling signal LAST NIB processor thereafter steps from state 2-1 into state 0-1.

State 0-1 is the final state of the first instruction. The address in the program counter register 60 therefore is transferred through the bus 100 to the masters of the address latches in preparation for addressing the first nibble of the next instruction. The processor steps on to state 0-3, the first state of the next subsequent instruction.

The second instruction, also an instruction MOV, is used for loading data into the input/output control register 35 at another special address. In this operation wherein the machine steps through states 0-3, 0-C, 0-4, 0-6, 1-F, 1-B, 1-7, 1-9, 1-A, 1-D, 1-F, 1-A, 3-9, 3-0, 2-2, 2-3, 2-4, 2-0, 2-1, 0-1, one nibble of data is stored into the register 35. In the respective states this nibble is fetched as immediate data in the program stored in the read only memory 20. The data is transferred through the data bus 24 and is multiplexed to the temporary register 27. The nibble is coupled through the arithmetic logic unit 30 without alteration and back onto the data bus 24. From there it is gated into the input/output control register 35 completing execution of the second instruction. This information stored in the register 35 is retained continuously in that register throughout the illustrative direct memory access operation. The two bits of the data stored in the register 35 describe which kind of direct memory access operation is to occur. One bit determines whether an input transfer or an output transfer is to occur. For the first illustrative operation, this bit specifies an input operation. The other bit determines whether the information is transferred four bits in parallel or as a serial stream of bits. For the first illustrative operation, this bit specifies a parallel operation.

Thereafter the processor continues executing instructions from the read only memory 20 routinely while the direct memory access controller loops in its state 0 which is to be described subsequently. The main processor continues executing instructions until the signal DMA REQ is applied by the peripheral device B to the direct memory access and control 85 of FIG. 17. This may occur during the middle of the execution of an instruction and is shown in FIG. 22. When the direct memory access controller receives the signal DMA REQ, it generates a signal IOCIOON, as shown in FIGS. 17 and 22. As a result of the foregoing signal changes, the main controller programmable logic array and random logic 70 finishes execution of the current instruction, leaving in the program counter register 60 the address of the program location containing the opcode commencing the next following instruction in the main program. In FIG. 8 this occurs during state 0-1 of the main controller while the signal IOCIOON is on. It causes the main processor controller to step into state 0-2.

At this time the main controller is ready to relinquish control of operations to the direct memory access controller 85. The main controller stays in state 0-2 throughout the direct memory access operation. In this state the direct memory access pointer is transferred from the register 78 through the bus 116, 117, 118 into the masters of the address latches 99. The main controller sends a coded combination of signals CIOA and CIOF to the direct memory access controller indicating that the main controller is suspending its control of operation for the duration of the direct memory access operation.

Figure 24:
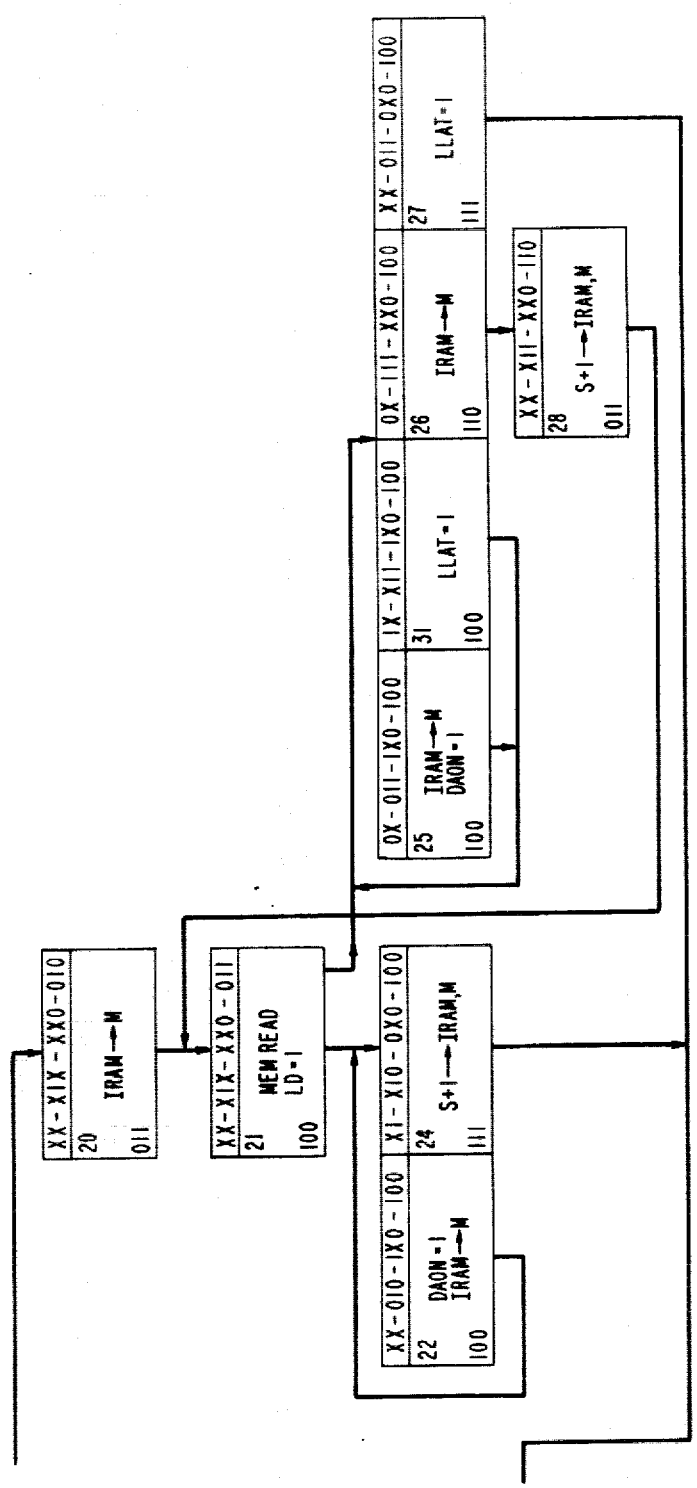

Referring again to FIG. 17, the direct memory access controller 85 includes a programmable logic array and a state counter 854 which are arranged in a feedback loop to control operations through a series of states during the direct memory access operations. These states are shown illustratively as boxes on the state diagram of FIGS. 23 and 24. The direct memory access controller progresses through those boxes from states 0 and 2 at the to of the drawing through to the state 29 at the bottom in synchronism with the clock driving the main processor. In state 0 the direct memory access controller continuously repeats that state until the main controller relinquishes control.

When the codec combination of signals CIOA and CIOF occurs, it gates the signal DMA REQ to the input of the programmable logic array in the direct memory access controller 85. This signal at the input of the programmable logic array takes the direct memory access controller out of its state 0 and makes it step into state 2. State 2 is a wait state and the controller steps on into state 3 which is also a wait state. These two wait states have been included in the operation to assure that the address bus 40 and the data bus 24 are free of any prior existing information. From state 3 the controller 85 steps into its state 14.

In state 14 the controller 85 turns on the signal DMA ACK which is transmitted to the peripheral B. The signal DMA ACK is latched up commencing with state 14 until the completion of the direct memory access operation. The controller 85 steps to its state 30.

When the peripheral device B receives the signal DMA ACK, it commences producing the signal ASYN CLK which is applied to the direct memory access controller 85. At this time the peripheral device B applies 4 bits of data in parallel to the microcomputer pins of the inport 43.

In state 30 logic circuitry associated with the direct memory access controller produces a signal PARIN of FIG. 17 which is derived from the data stored in the input/output control register 35 and which enables the inport transmission gate 38 to apply the data from the peripheral device B onto the data bus 24. Because of the signals ASYN CLK, and PARIN, the data on the data bus is loaded into a shift register of the direct memory access controller 85. This data also is gated immediately into latches included in the controller 85. The controller 85 loops in state 30 until the signal ASYN CLK turns off and the controller steps into its state 16.

In state 16 the information stored in the direct memory access pointer register 78 is transferred to the masters of the address latches 99. This is the first address in a sequence of addresses where the nibbles of data are to be stored when they are received. At the end of the machine cycle, the information stored in the masters is transferred into the slaves thereof and thereupon is applied to the address bus. It is noted that these address latches are the same address latches used for normal processor addressing. The controller 85 then steps to its state 17.

In state 17 the received data now stored in the latches of the controller 85 is gated onto the data bus 24. The controller 85 generates and applies to the memory circuits a write signal WR. Thus the data on the data bus is written into the memory location addressed by the address appearing on the address bus. During this state the information stored in the pointer register 78 is again transferred to the masters of the address latch 99 and the controller 85 steps to state 18.

In state 18 the address stored in the slave of the address latches is incremented in the address arithmetic unit 62 and the result is stored in the masters of the address latch and in the pointer register 78. The same address latches and address arithmetic unit used in normal program flow now are used in this direct memory access addressing operation. The controller 85 then steps into state 30.

The controller further steps through states 30, 16, 17 and 18 a sufficient number of times to complete the transfer of all nibbles of information to be transmitted from the peripheral device B to the random access memory 22. One nibble is transferred in response to each pulse of the signal ASYN CLK. When the peripheral device B determines that all of the data has been transferred, it turns off the signal DMA REQ and controller 85 steps from state 18 into state 15, a wait state, and on into state 29 to initiate an interrupt service routine.

In state 29 the controller 85 clears its own control latches 854. An interrupt signal IOCINT is generated and latched within the controller 85. The signals DMA ACK and IOCIOON are both turned off. Referring again to FIG. 8, as soon as the signal IOCIOON goes off, the main controller leaves it state 0-2 and steps into state 0-1.

As shown in FIG. 21, the direct memory access controller 85 then commences looping in its state 0 and continues to loop therein until the signal DMA REQ is received from the peripheral device B at a later time.

In state 0-1 the main controller of the microcomputer causes the address in the program counter 60 to be transferred into the masters of the address latch 99. In response to a signal IOCINT, the main controller steps to its state 0-8.

In state 0-8 address x(020) is generated by the address arithmetic unit 62 and is stored into the masters of the address latches 99 and in the temporary register 93. This address is the address of the beginning of the interrupt service routine. The main controller then steps into state 0-A. In state 0-A the stack pointer from register 82 is put into the master of the address latches and the machine steps into the next state. During the next three states of the main controller, we move the program counter to the stack, a nibble at a time, and decrement the stack pointer each time. Thereafter the main controller steps to its state 0-E.

In state 0-E the address stored in the slaves of the address latch is transferred into the stack pointer 82 and into the masters of the address latches. The main controller goes on to its state 0-F.

In state O-F the address x(020) contained in register 93 is transferred into the program counter 60 and into the masters of the address latches 99. The main controller then steps into state 0-1.

In state 0-1 the address x(020), for the beginning of an interrupt service routine and being stored in the program counter 60, is transferred into the masters of the address latches 99. The address x(020) is applied to the address bus and the controller steps to state 0-3 which is the beginning of the fetch portion of the interrupt service routine.

The interrupt service routine is designed to test data transferred from the peripheral device B to the random access memory 22. This data represents the operational status of other equipment associated with the peripheral device B. Upon completion of this status testing, the direct memory access pointer stored in the register 78 is reset to its initial value, i.e., data at x(111), x(112), and x(113), in preparation for another direct memory access operation. Thus the interrupt service routine concludes with another operation moving data into the direct memory access pointer 78.

Thereafter the main controller does an interrupt return instruction. It fetches the required opcode through states 0-3, 0-4, 0-6 and in response to the execution vector goes into state 1-1. The contents of the stack pointer, i.e., the address of the stack, is transferred into the masters of the address latches and the main controller steps to its state 3-A wherein the stack pointer address is incremented and stored in the masters of the address latches.

In the next three states 3-7, 3-2, 1-0, the main controller picks up the program return address for the program counter register 60. This return address is contained in three nibbles of the stack in random access memory, which nibbles are accessed consecutively and are stored in the respective nibbles of the program counter. The address in the stack pointer register 82 is incremented during each of those states. For example in state 3-7, a nibble is fetched from the stack in random access memory 22, is transferred through the data bus 24, multiplexer 102, and bus 100, and is stored in the low order nibble of the program counter register 60. The address in the slaves of the address latches is incremented in the address arithmetic unit 62 and is stored in the masters of the address latches. The main processor controller then steps on to its state 3-2. At the end of the third time in state 1-0, the controller goes to state 1-2.

In state 1-2 the controller stores in the stack pointer register 82 the new stack address and goes on to its state 0-1 the final state of the interrupt service routine.

In state 0-1 the address then stored in the program counter is transferred to the masters of the address latches. This address is the address of the beginning of the instruction which would have been executed if the direct memory access operation had not occurred. The main controller now steps to its state 0-3 and starts the execution of that instruction.

In a second illustrative operation, we will describe a direct memory access arrangement for a four bit serial input from the peripheral device D through a chip terminal to the microcomputer. Other peripheral devices are considered to be omitted from the arrangement for the purpose of clearly explaining the serial input operation. Again, it is necessary to first prepare the microcomputer for the operation.

As mentioned in the first illustrative operation, information is stored in the direct memory access pointer register 78 and in the input/output control register 35. The information stored in the register 35 is two bits, representing respectively the serial operation and input to the microcomputer. This data is held in the register 35 throughout this illustrative operation. The information stored in the register 78 represents any appropriate address in writeable memory. This address remains stored in the register 78 until the illustrative direct memory access operation commences.

While the main processor is executing instructions, the direct memory access controller loops in its state 0 of FIG. 23, as in the first illustrative operation. The main processor continues executing instructions until the signal DMA REQ is applied to the direct memory access circuit 85 by the peripheral device D. This is represented in FIG. 22 by the signal DMA REQ going to zero. Thereafter the current instruction is executed until it is completed. Then the main controller suspends operation of the main processor and turns over control to the direct memory access controller 85. When the direct memory access controller 85 assumes control, it steps from its state 0 through its states 1 and 3 of FIG. 23, as in the first illustrative operation.

From state 3, the controller 85 now steps into its state 7. At this time a counter included in the controller 85 is initially reset in an all zeros state. A signal DMA ACK is generated and is sent to the peripheral device D. The controller 85 loops in state 7 until the signal ASYN CLK is toggled four times after the occurrence of the signal DMA ACK. At the rising edge of the first pulse of the signal ASYN CLK, the first bit of data is clocked from the peripheral device D through the chip terminal and the lead 130 into the first stage of the shift register included in control circuit 85. The latching circuit, included in the control circuit 85, is not operated at this time. Also in response to the rising edge of the signal ASYN CLK, the counter in the controller 85 is incremented by "1". During and after the occurrence of the first pulse of the signal ASYN CLK, the controller 85 loops in its state 7 awaiting three more clock pulses. This operation continues similarly until those three additional clock pulses strobe data bits into the shift register of the controller 85.

When the fourth bit finally is entered into the shift register, the counter of the controller 85 overflows and generates a signal indicating it is full. This causes all four data bits to be moved in parallel from the stages of the shift register to stages of the latch included in the direct memory access controller 85. This applies a signal LAT to the counter 852 within the controller 85 of FIG. 17, which is thereby reset to its zero state. During state 7, the peripheral device D disables the signal DMA REQ because all four bits of data have been transferred to the direct memory access controller 85.

The signal LAT causes the controller 85 to step into its state 8 wherein the data being stored in the direct memory access pointer register 78 is transferred into the address latches 99. These are the same address latches used for normal program flow. This is the address at which the data being transferred from the peripheral device D is to be stored. Then the controller 85 steps into its state 10.

In state 10 information stored in the latches of the controller 85 is transferred to the memory location pointed to by the address latches. This address also is transferred to the masters of the address latches. Then the controller 85 steps into its state 12.

In state 12 the address stored in the slaves of the address latches is incremented by "1" in the address arithmetic unit 62, the same address arithmetic unit used for normal program addressing. The result is stored in the direct memory access pointer register 78 and in the masters of the address latches. The controller 85 again steps along into state 29 which has been described previously.

From this point in the sequence of operations, the main processor continues through the previously described interrupt service routine and continues thereafter processing its main program.

In a third illustrative operation we will describe the procedure for parallel output from any addressable memory in the microcomputer to the peripheral device C. Other peripheral devices are considered to be omitted from the arrangement for the purpose of clearly explaining the illustrative parallel output operation.

In accordance with the previous illustrative operations, two bits of data are stored in the input/output control register 35. For this operation these two bits represent, respectively, a parallel operation and an operation directing data out of the microcomputer. These two bits of data are held in the input/output control register 35 throughout the illustrative parallel output operation.

Also in accordance with the previous illustrative operations, data is stored in the direct memory access pointer register 78. This time the address is the first nibble of data to be transferred from the microcomputer to the peripheral device C and can be any address in addressable memory within the microcomputer. The address stored in the register 78 remains there until the illustrative direct memory access operation commences.

As in the two prior illustrative operations, a signal DMA REQ occurs during the execution of some instruction. The machine continues executing that instruction until it is completed. Control by the main processor is suspended and control is turned over to the direct memory access controller 85 for the duration of the illustrative parallel output direct memory access operation. The controller 85 proceeds from its state 0 through its states 1 and 3, as in the previously described illustrative operations. From state 3, however, it steps into state 20.

In state 20, the address stored in the pointer register 78 is transferred through the bus 100 to the masters of the address latches, which are the same latches used for addressing in normal program flow. This address is the address of the first nibble of data to be transferred from the microcomputer to the peripheral device C. The controller 85 steps into its state 21.

In state 21 the controller causes data to be read from the memory location pointed to by the address in the slaves of the address latches. This data is the first nibble of data to be transferred from the microcomputer to the peripheral device C during this illustrative direct memory access operation. This data can be read from any readable address in random access memory 22 or read only memory 20, any addressable register, or any of the input/output circuits. The read signal RD of FIG. 15, produced by the controller 85, causes data from the memory location being pointed to by the address latches to be put on the data bus 24. A load data signal from the DMA controller 854 loads that data in a parallel operation into the stages of the shift register of controller 85. The controller now steps into its state 25.

In state 25 the controller 85 turns on the signal DMA ACK. The signal ASYN CLK generated by the peripheral device C is lowered, i.e., turned on, indicating that the peripheral device C is ready to accept a first nibble of data in the direct memory access transfer from the microcomputer. Also during this state the address stored in the pointer register 78 is again transferred into the masters of the address latches. Now the controller 85 steps into its state 31.

In state 31 data is transferred into the latches 851 of the controller 85 from the associated shift register 850 by a signal from the controller 854. Since the signal ASYN CLK is on, data from the latches is gated out onto the data bus 24. Transmission gate 37 between the data bus 24 and the input/output bus 47 is enabled allowing the data on the data bus 24 to be transferred out onto chip output terminals 48. At this time the data is valid on the data bus interconnecting the microcomputer with the peripheral device C. The peripheral device C accepts this data by raising the signal ASYN CLK, i.e., turning it off. It is noted that the signal ASYN CLK must be on for at least one machine cycle of the microcomputer before being turned off. Controller 85 loops in its state 31 as long as the signal ASYN CLK is turned off. The signal DMA REQ also is turned off and the controller 85 steps into its state 26.

In state 26 the address in the pointer register 78 is transferred into the masters of the address latch and the controller 85 steps into its state 28 wherein the address in the slaves of the address latch are incremented by the address arithmetic unit 62. The resultant incremented address is transmitted through the buses 115, 116, 117, 118 and stored in the pointer register 78 and in the masters of the address latch. Controller 85 steps on into its state 21.

In state 21 the controller 85 causes data to be read from the memory location pointed to by the address stored in the slaves of the address latches. This is the incremented address where the next nibble of data to be transferred is being stored. The read signal RD produced by the controller circuit 85 causes data from that address to be put on the data bus 24. The load data signal LD loads that data from the data bus 24 into the shift register included in the controller 85. Because the signal DMA REQ now is turned off, the controller 85 steps into its state 27.

In state 27 the data stored in the shift register of the controller 85 is transferred in a parallel operation into the latches also included in the controller 85. Gates from the output of the controller 85 to the data bus 24 are disabled during this state so that the data does not go out on the data bus. Controller 85 now steps into its state 29, the final state of the illustrative parallel output direct memory access operation. State 29 has been described previously with respect to the first and second illustrative operations.

When control is returned to the main controller of the microcomputer, an interrupt service routine is commenced. This interrupt service routine differs from the previously described interrupt service routine because the information transferred out of the microcomputer to the peripheral device C is not processed by the main processor at this time. Therefore the microcomputer proceeds directly to the interrupted program by executing an interrupt return instruction.

In a fourth illustrative operation, we will describe a direct memory access procedure for a four-bit serial output from the microcomputer to the peripheral device E. The other peripherals are considered to be omitted from the arrangement for the purposes of clearly explaining this fourth illustrative operation. As in the first three illustrative operations, information must first be stored in the register 35 and the pointer register 78. Two bits are stored in the input/output control register 35, respectively, representing a serial operation and data output. These two bits are held in the register 35 throughout the illustrative operation. An address representing any appropriate address in readable memory can be stored in the pointer register 78 until the illustrative direct memory access operation commences.

A signal DMA REQ is generated by the peripheral device E initiating a sequence of events that are similar to the third illustrative operations until the controller 85 reaches its state 21 the first time. From state 21 the controller 85 now steps into state 22 because of the two bits stored in the input/output control register 35.

In state 22 the controller 85 turns on the signal DMA ACK. The address stored in the pointer register 78 is transferred into the masters of the address latches, and the peripheral device E turns on the signal ASYN CLK. Thus the peripheral device E indicates it is ready to receive a nibble of data in serial form. The nibble of data from the address pointed to by the direct memory access pointer is transferred into the shift register in the controller 85. The controller 85 loops in its state 22 until the signal ASYN CLK completes four pulses and turns off. For each pulse of the signal ASYN CLK, the controller 85 shifts one bit of data out of the shift register onto the lead 132 connecting with the peripheral device E. Thus when four of the clock pulses have occurred, the entire nibble of data is shifted out of the shift register of controller 85 and into the peripheral device E which then turns off the signal DMA REQ. In response to the turn-off of the signal DMA REQ, the controller 85 steps into its state 24.

In state 24 the address stored in the slaves of the address latch is incremented by the address arithmetic unit 62 and the resultant incremented address is stored both in the pointer register 78 and in the masters of the address latches. Controller 85 then steps into state 29, the final state of the illustrative serial output direct memory access operation. This state 29 was described in the previous illustrative operation.

The main controller assumes control of the microcomputer once again and commences processing an interrupt service routine similar to the one described briefly with respect to the third illustrative direct memory access operation.

The foregoing description describes several illustrative embodiments of the invention. These embodiments together with other embodiments obvious to those skilled in the art are considered to be within the scope of the invention.

We claim:

1. A microcomputer system fabricated on a single chip comprising an addressable memory (20,22) and a processing unit (27, 30, 32, 70, 96) interconnected by an internal data bus (24); addressing means (60, 62, 78, 99, 102) connected by way of an address bus (40) to the addressable memory for applying by way of the address bus a first address from which data is read to the processing unit during a first period; and a direct memory access circuit (85) interconnected with the internal data bus; the addressing means being arranged for applying directly by way of the address bus to the addressable memory a second address, from which data is to be transferred to the direct memory access circuit during a second period or to which data is to be transferred from the direct memory access circuit during the second period.

2. A microcomputer system in accordance with claim 1 wherein the processing unit suspends operating for the duration of the second period while the direct memory access circuit assumes control until the direct memory access operation is completed.

3. A microcomputer system in accordance with claim 1 or claim 2 wherein terminals of the microcomputer system are coupled through a first gate (38) to the internal data bus for transferring data received on the terminals in parallel through the first gate and the data bus into latches in the direct memory access circuit, the direct memory access circuit being arranged for further transferring such data in parallel from the latches through a second gate and the internal data bus to the second address in the addressable memory.

4. A microcomputer system in accordance with claim 1 or claim 2 wherein a terminal (130) of the microcomputer system is interconnected with a serial input of a shift register (850) in the direct memory access circuit (85) for transferring data received on the terminal into the shift register, the direct memory access circuit being arranged for further transferring such data in parallel to latches (851) in the direct memory access circuit and in parallel from the latches through a gate and the internal data bus (24) to the second address in the addressable memory.

5. A microcomputer system in accordance with claim 1 or claim 2 wherein the direct memory access circuit is arranged for receiving and storing data in parallel from the second address in the addressable memory by way of the internal data bus, and a gate (37) and latches connected between the data bus and terminals (48) of the microcomputer system, such gate, latches and the direct memory access circuit being arranged to transfer the data stored in the direct memory access circuit in parallel through the data bus and the gate to the terminals (48).

6. A microcomputer system in accordance with claim 1 or claim 2 wherein the direct memory access circuit is arranged with a shift register for receiving and storing data in parallel from the second address in the addressable memory by way of the internal data bus and for converting such data from parallel to serial at an output, and a gate is arranged between the serial output of the shift register and a terminal (132) of the microcomputer system for controlling serial transfer of the data to the terminal.

7. A microcomputer system made on a chip comprising an addressable memory (20, 22) and a processing unit (27, 30, 32, 70, 96) interconnected by an internal data bus (24);

addressing means (60, 62, 78, 99, 102) connected by way of an address bus (40) to the addressable memory for applying by way of the address bus a first address from which data is read to the processing unit during a first period; and a direct memory access circuit (85) interconnects with the internal data bus; the addressing means being arranged for applying directly to the addressable memory a second address, representing a memory location from which data is to be read for transfer to the direct memory access circuit or to which data is to be written from the direct memory access circuit, in response to a control signal (MEMR or MEMW) from the direct memory access circuit during a second period.

8. A microcomputer system in accordance with claim 7 wherein the processing unit suspends operating for the duration of the second period while the direct memory access circuit assumes control until the direct memory access operation is completed.

9. A microcomputer system made on a chip comprising an addressable memory (20, 22) and a processing unit (27, 30, 32, 70, 96) interconnected by an internal data bus (24);

addressing means (60, 62, 78, 99, 102) connected by way of an address bus (40) to the addressable memory for applying by way of the address bus a first address from which data is read to the processing unit during a first period; and a direct memory access circuit (85) interconnects with the internal data bus; the addressing means being arranged for applying directly to the addressable memory a second address, representing a memory location from which data is to be read, in response to a read signal (MEMR) from the direct memory access circuit, for transfer to the direct memory access circuit during a second period.

10. A microcomputer system in accordance with claim 9 wherein the processing unit suspends operating for the duration of the second period while the direct memory access circuit assumes control until the direct memory access operation is completed.

11. A microcomputer system made on a chip comprising an addressable memory (20, 22) and a processing unit (27, 30, 32, 70, 96) interconnected by an internal data bus (24);

addressing means (60, 62, 78, 99, 102) connected by way of an address bus (40) to the addressable memory for applying by way of the address bus a first address from which data is read to the processing unit during a first period; and a direct memory access circuit (85) interconnects with the internal data bus; the addressing means being arranged for applying directly to the addressable memory a second address, representing a memory location into which data is to be written from the direct memory access circuit, in response to a write signal (MEMW) from the direct memory access circuit during a second period.

12. A microcomputer system in accordance with claim 11 wherein
the processing unit suspends operating for the duration of the second period while the direct memory access circuit assumes control until the direct memory access operation is completed.

13. A microcomputer system fabricated on a single semiconductor chip comprising an addressable memory and a processing unit interconnected by an internal data bus;

addressing means connected by way of an address bus to the addressable memory for applying a first address from which data is transferred to the processing unit; and a direct memory access circuit interconnected with the internal data bus for receiving data from the addressable memory or for transferring data to the addressable memory at a second address applied from the addressing means.

14. A microcomputer system fabricated on a single semiconductor chip comprising an addressable memory;

a processing unit;

an internal data bus interconnecting the addressable memory and the processing unit;

addressing means connected by way of an address bus to the addressable memory for applying to the addressable memory an address of a location in the addressable memory; and a direct memory access circuit interconnecting with the internal data bus for receiving data directly from the location addressed or for transferring data directly to the location addressed.

* * * * *